US00RE36667E

United States Patent [19]

Michaelis et al.

[11] E Patent Number: Re. 36,667

[45] Reissued Date of Patent: Apr. 25, 2000

[54] DROPLET DEPOSITION APPARATUS

[75] Inventors: A. John Michaelis, Glen Ellyn, Ill.; Anthony D. Paton; Stephen Temple, both of Cambridge, United Kingdom; W. Scott Bartky, Chicago, Ill.

[73] Assignee: Xaar Limited, Cambridge, United Kingdom

[21] Appl. No.: 08/515,490

[22] Filed: Aug. 15, 1995

Related U.S. Patent Documents

Reissue of:

[64] Patent No.: 4,887,100
Issued: Dec. 12, 1989
Appl. No.: 07/140,617
Filed: Jan. 4, 1988

[30] Foreign Application Priority Data

Jan. 10, 1987 [GB] United Kingdom ..... 8700531
Jan. 10, 1987 [GB] United Kingdom ..... 8700533

[51] Int. Cl.[7] ..... B41J 2/04

[52] U.S. Cl. ..... 347/69; 347/71

[58] Field of Search ..... 347/68, 69, 71

[56] References Cited

U.S. PATENT DOCUMENTS

| | | | |
|---|---|---|---|
| 3,115,588 | 12/1963 | Hueter | 310/359 |
| 3,747,120 | 7/1973 | Stemme | 346/75 |
| 3,848,188 | 11/1974 | Rittberg | 239/101 |
| 3,857,049 | 12/1974 | Zoltan | 310/8.1 |
| 3,946,398 | 3/1976 | Kyser et al. | 346/1 |
| 3,988,745 | 10/1976 | Sultan | 346/140 R |
| 4,032,929 | 6/1977 | Fischbeck et al. | 346/140 R |
| 4,104,646 | 8/1978 | Fischbeck | 346/140 R |
| 4,158,847 | 6/1979 | Heinzl et al. | 346/140 R |
| 4,189,734 | 2/1980 | Kyser et al. | 346/1.1 |
| 4,216,483 | 8/1980 | Kyser et al. | 346/140 R |
| 4,245,227 | 1/1981 | Krause | 346/75 |
| 4,284,996 | 8/1981 | Greve | 346/140 R |
| 4,353,078 | 10/1982 | Lee et al. | 346/140 R |
| 4,367,478 | 1/1983 | Larsson | 346/140 R |
| 4,368,476 | 1/1983 | Uehara et al. | 346/140 R |
| 4,383,264 | 5/1983 | Lewis | 346/140 R |
| 4,385,304 | 5/1983 | Sniderman | 346/140 R |
| 4,409,602 | 10/1983 | Bolmgren et al. | 346/140 R |
| 4,420,764 | 12/1983 | Okada | 346/140 R |
| 4,442,443 | 4/1984 | Martner | 346/140 R |
| 4,443,807 | 4/1984 | Koto | 347/70 |

(List continued on next page.)

FOREIGN PATENT DOCUMENTS

| | | |
|---|---|---|
| 67 653 A2 | 12/1982 | European Pat. Off. . |
| 61-45542 | 10/1986 | Japan . |
| 2 050 949 | 1/1981 | United Kingdom . |

OTHER PUBLICATIONS

Tsao, C.S. Drop–on–Demand Ink Jet Nozzle Array . . . Crystal; IBM TDB vol. 23, No. 10, Mar. 1981, pp. 4438. IBM Technical Disclosure Bulletin vol. 23, No. 10 in Mar. 1981.

*Primary Examiner*—John Barlow
*Attorney, Agent, or Firm*—Marshall, O'Toole, Gerstein, Murray & Borun

[57] ABSTRACT

A pulsed droplet ink jet printer has relatively long thin ink channels extending in parallel between an ink manifold 13, and a nozzle plate 5 providing a nozzle 6 for each channel. Side walls 11 may be formed substantially entirely of piezo-electric material so as to be displaceable transversely into a selected channel on the application of an electric field. This transverse displacement produces an acoustic wave in the channel which results in the ejection of an ink droplet. The side walls may deflect in shear mode to a cross-section of chevron formation. Usefully, it is arranged that both side walls adjoining the selected channel are displaced inwardly of the channel to cooperate in droplet ejection. Under this arrangement, the channels are assigned alternately to first and second groups of channels, only one group of channels being capable of actuation at any one instant. The nozzles associated with the respective groups of channels may be offset so as to compensate for the time delay in actuation of channels in the first and second groups.

65 Claims, 10 Drawing Sheets

U.S. PATENT DOCUMENTS

| | | | |
|---|---|---|---|
| 4,453,169 | 6/1984 | Martner | 346/140 PD |
| 4,471,363 | 9/1984 | Hanaoka | 346/140 R |
| 4,502,058 | 2/1985 | Koto | 346/140 R |
| 4,520,374 | 5/1985 | Koto | 346/140 R |
| 4,521,788 | 6/1985 | Kimura et al. | 346/140 R |
| 4,525,728 | 6/1985 | Koto | 346/140 R |
| 4,528,575 | 7/1985 | Matsuda et al. | 346/140 R |
| 4,536,097 | 8/1985 | Nilsson | 400/126 |
| 4,549,191 | 10/1985 | Fukuchi et al. | 346/140 R |
| 4,550,325 | 10/1985 | Viola | 346/140 R |
| 4,564,851 | 1/1986 | Nilsson et al. | 346/140 R |
| 4,566,017 | 1/1986 | Nilsson | 346/140 R |
| 4,566,018 | 1/1986 | Nilsson | 346/140 R |
| 4,571,602 | 2/1986 | De Schamphelaere et al. | |
| 4,578,686 | 3/1986 | Vollert | 346/140 R |
| 4,584,590 | 4/1986 | Fischbeck et al. | 346/140 R |
| 4,599,628 | 7/1986 | Doring et al. | 346/140 R |
| 4,611,219 | 9/1986 | Sugitani et al. | 347/71 |
| 4,635,079 | 1/1987 | Hubbard | 346/140 R |
| 4,641,153 | 2/1987 | Cruz-Uribe | 346/140 R |
| 4,641,155 | 2/1987 | Zoltan | 346/140 R |
| 4,695,854 | 9/1987 | Cruz-Uribe | 347/71 |
| 4,752,788 | 6/1988 | Yasuhara et al. | 346/140 R |

DROPLET DEPOSITION APPARATUS

Matter enclosed in heavy brackets [ ] appears in the original patent but forms no part of this reissue specification; matter printed in italics indicates the additions made by reissue.

BACKGROUND OF THE INVENTION

This invention relates to pulsed droplet deposition apparatus and more particularly to such apparatus including a plurality of droplet deposition channels. Typical of this kind of apparatus are multi-channel pulsed droplet ink jet printers, often also referred to as "drop-on-demand" ink jet printers.

An existing technology for the production of multi-channel drop-on-demand ink jet printers is known from, for example, U.S.-A-3,179,042; GB-A-2 007 162 and GB-A-2 106 039. These patent specifications disclose thermally operated printheads which, in response to an electrical input signal, generate a heat pulse in selected ink channels to develop a vapour bubble in the ink of those selected channels. This in turn generates a pressure pulse having the pressure and time characteristics appropriate for the ejection of an ink droplet through a nozzle at the end of the channel.

Thermally operated printheads of this nature possess a number of significant disadvantages. First, the thermal mode of operation is inefficient and typically requires 10 to 100 times the energy to produce an ink droplet as compared with known piezo-electric printheads. Second, difficulties are found in providing the very high levels of reliability and extended lifetimes which are necessary in an ink jet printhead. For example, thermally operated printheads have a tendency for ink deposits to form on the heating electrodes. Such deposits have an insulating effect sufficient to increase substantially the electrical pulse magnitude necessary to eject an ink droplet. Thermal stress cracks and element burn-out, as well as cavitation erosion, have also proved difficult to eliminate. Third, only ink specifically developed to tolerate thermal cycling can be used and suitable ink formulations often proved to be of low optical density compared with conventional inks.

Attempts have been made to produce multi-channel ink jet printers using piezo-electric actuators and reference is made in this connection to U.S.-A-4,525,728; U.S.-A-4,549,191 and U.S.-A-4,584,590 and IBM Technical Disclosure Bulletin Vol. 23 Mar. 10, 1981. Piezo-electric actuators have the advantage, compared with thermal processes, of low energy requirement. However, the existing proposals have not achieved the levels of printing resolution that are desired. A prime influence upon printing resolution is the number of channels, and thus nozzles, per unit length in the direction transverse to paper movement relative to the head. Existing piezo-electric printhead technology as exemplified by the prior art referenced above, is capable of achieving a maximum channel density of around 1 to 2 channels per mm. In terms of effective resolution, and by this is meant the density at which the droplets can be deposited upon paper, such nozzle density is for many applications insufficient. It does not, for example, enable a transverse line to be printed with ink droplets that are indistinguishable by the eye at normal reading distance.

Effective resolution can be increased, for example, by angling the printhead in the plane of the paper so as to decrease the inter-channel spacing in the transverse direction. However, this necessitates sophisticated control logic and the use of delay circuitry to ensure that all droplets associated with a particular print line are deposited on the paper in a single transverse line (or sufficiently close to the line to be indistinguishable therefrom by the eye). An alternative approach is to provide for movement of the printhead. As will be understood, this introduces significant mechanical and control complexities, and is not felt to be advantageous. A third approach to increasing effective resolution is to provide two or more banks of channels which are mutually spaced in the direction of paper movement but which cooperate to print a single transverse line. With only two such banks it may be possible to configure the nozzles of both channels in a common print line. With more banks, a significant nozzle spacing is built up in the direction of paper movement and delay circuitry is required to provide for the time spaced actuation of the channels necessary for spatial coincidence. The provision of delay circuitry adds to manufacturing costs by an amount which typically increases with the amount of delay required.

It is useful to note at this point that colour printing would typically require four banks of channels even if each bank provided in itself sufficient single colour resolution. Where a multiplicity of banks are required to produce the desired resolution for a single colour, it will be understood that colour applications compound the problems outlined above.

The advantages of decreasing the inter-channel spacing in the direction transverse to relative paper movement should now be apparent. In many cases, typically where colour printing is required, there are further advantages in reducing the inter-channel spacing along the direction of paper movement (that is to say between banks). This reduces the bulk dimensions of the printhead but more importantly reduces the time delays necessary for spatial coincidence.

SUMMARY OF THE INVENTION

Broadly, it is an object of this invention to provide improved multi-channel pulse droplet deposition apparatus operating at low energy levels and providing relatively large numbers of channels per unit length whether transverse to or parallel with the direction of paper movement, or both. It is a further object of this invention to provide such apparatus which is economic in manufacture.

The present invention in one aspect consists in a high density multi-channel array, electrically pulsed droplet deposition apparatus, comprising a multiplicity of parallel droplet liquid channels, mutually spaced in an array direction normal to the length of channels, each of said channels being separated from a like channel by a side wall which is transversely displaceable in respective opposite senses and which extends in the lengthwise direction of the channels, and in a direction which is both normal to said lengthwise direction and normal to the array direction, respective nozzles opening into said channels for ejection therefrom of droplets of liquid, connection means for connecting said channels to a source of droplet deposition liquid and electrically actuable means located in relation to said channels for effecting in each channel selected for actuation, transverse displacement generally parallel to said array direction of said transversely displaceable side wall of said selected channel, to cause change of pressure in said selected channel to effect droplet ejection from the nozzle opening thereinto.

BRIEF DESCRIPTION OF THE DRAWINGS

The invention will now be described, by way of example, with reference to the accompanying, diagrammatic drawings, in which.

DESCRIPTION OF THE PREFERRED EMBODIMENTS

Figure 1A:
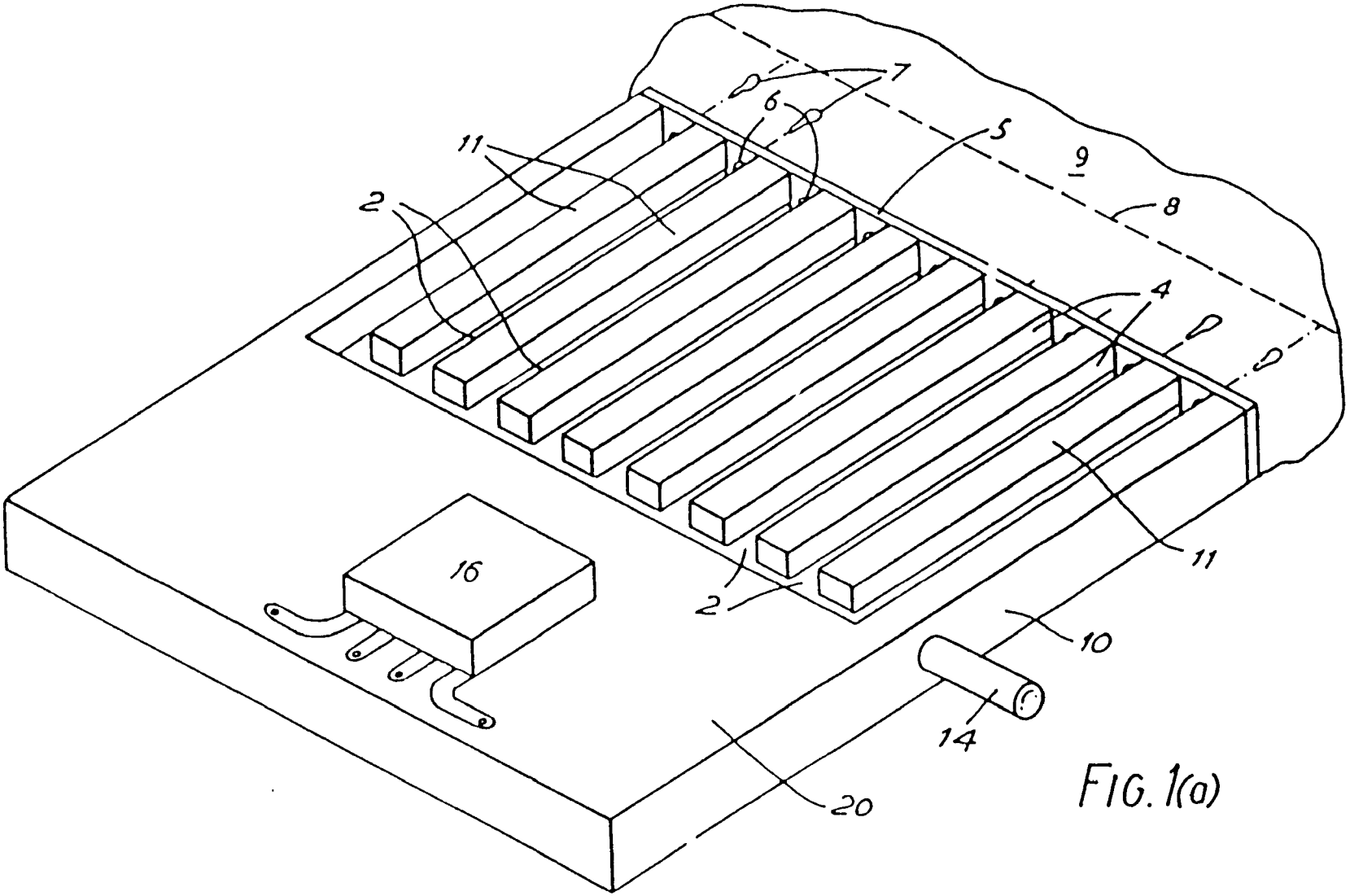
FIG. 1(a) is a schematic perspective view of a generalised form of multi-channel pulsed droplet deposition apparatus, namely, a drop-on-demand ink-jet array printhead, according to the invention, with parts (particularly a cover plate) omitted to reveal structural details.

In the drawings, like parts have been accorded the same numerical references.

Figure 1B:
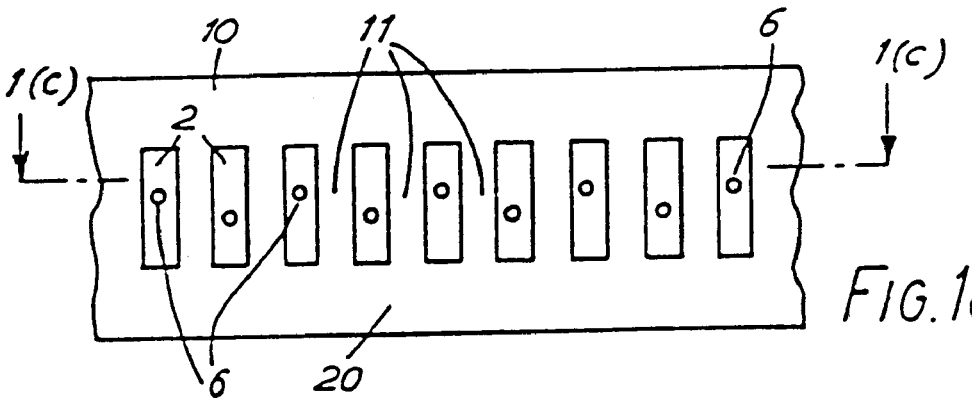
FIG. 1(b) is a cross-sectional view taken normal to the axes of the channels of the generalised printer illustrated in FIG. 1(a)
Figure 1C:
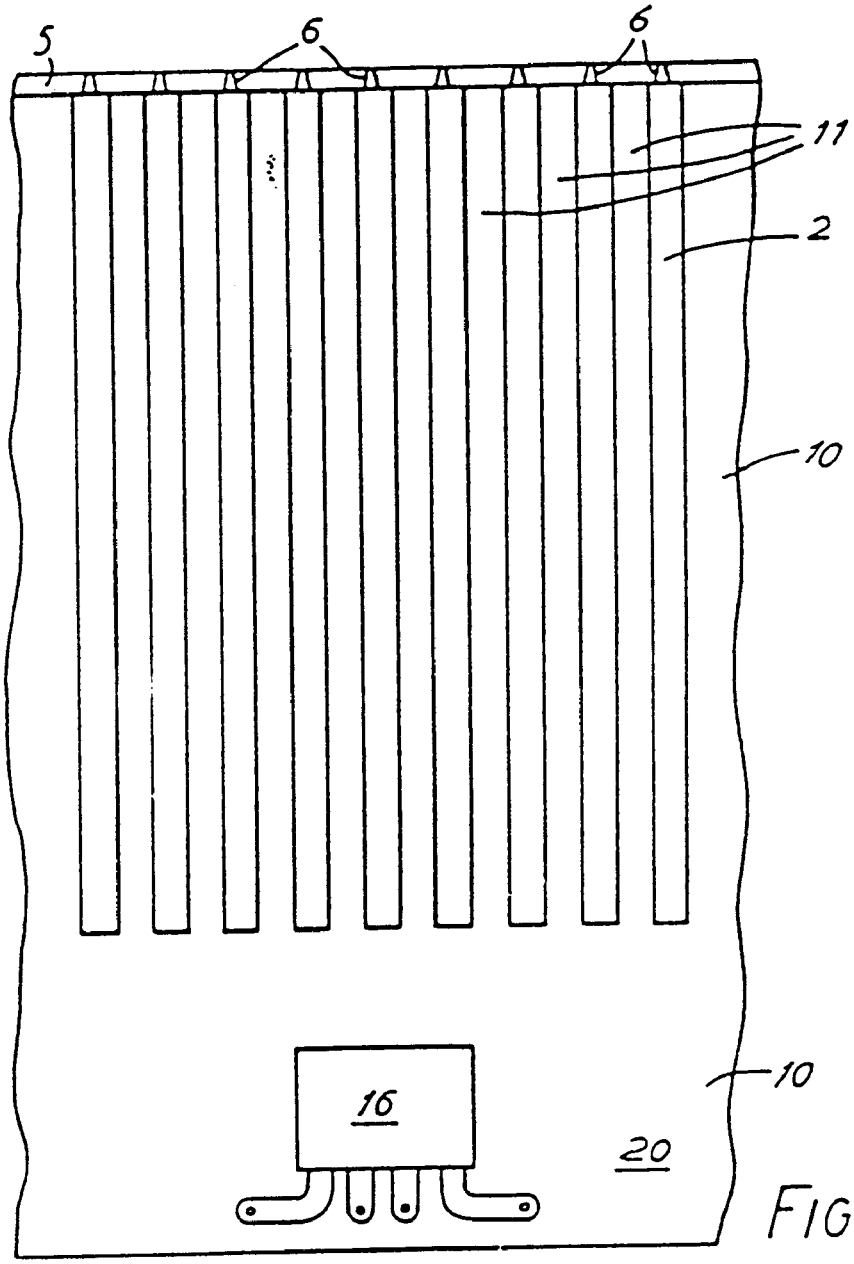
FIG. 1(c) is a sectional plan view taken on the line 1(c)—1(c) of FIG. 1(b)

Referring first to FIGS. 1(a), 1(b) and 1(c), a planar high-density array, drop-on-demand ink jet printer comprises a printhead 10 formed with a multiplicity of parallel ink channels 2, nine only of which are shown and the longitudinal axes of which are disposed in a plane.

By "high-density array" in this context is meant an array in which the ink channel density along a line intersecting the channel axes perpendicularly, is at least two per millimetre. The channels 2 contain ink 4 and terminate at corresponding ends thereof in a nozzle plate 5 in which are formed nozzles 6, one for each channel. Ink droplets 7 are ejected on demand from the channels 2 and deposited on a print line 8 of a print surface 9 between which and the printhead 10 there is relative motion normal to the plane of the channel axes.

The printhead 10 has a planar base part 20 in which the channels 2 are cut or otherwise formed so as to extend in parallel rearwardly from the nozzle plate 5. The channels 2 are long and narrow with a rectangular cross-section and have opposite side walls 11 which extend the length of the channels. The side walls 11 are displaceable transversely relatively to the channel axes along substantially the whole of the length thereof, as later described, to cause changes of pressure in the ink in the channels to effect droplet ejection from the nozzles. The channels 2 connect at their ends remote from the nozzles, with a transverse channel 13 which in turn connects with an ink reservoir (not shown) by way of pipe 14. Electrical connections (not shown) for activating the channel side walls 11 are made to an LSI chip 16 on the base part 20. By designing the working parts for the multiplicity of parallel channels of the printhead in a planar configuration, the manufacture of printheads with very large numbers of parallel print channels can be performed in a sequence of parallel operations, as hereinafter described, working on jigs supporting a large number of base parts at one time.

High density of packing of the ink channels 2 and, therefore, of the nozzles 6 is achieved by a number of features not found in prior art array printheads. First, the ink channels 2 are rectangular in the cross-section thereof viewed normal to the channel axes, the side walls 11 (which form the longer edge of each channel cross-section) extending normal to the plane containing the channel axes. The aspect ratio of the channel cross-sections i.e. the ratio of the dimensions normal and parallel to the plane of the channel axes, is substantial, typically 3 to 30. The channels particularly are separated by transversely displaceable side walls 11 which are electrically actuated to effect printing.

In certain prior art arrays, see for example U.S. Pat. Nos. 4,525,728 (Koto), 4,549,191 (Fukuchi and Ushioda) and 4,584,590 (Fishbeck and Wright), the channels employ droplet ejection actuators not in walls between the channels thereof but in the top walls bounding the respective channels. The use of such "roof" actuators limits the channel density, even after optimisation, to 1 to 2 channels per millimetre. With channels having displaceable side walls and high aspect ratio cross-sections disposed with their longer dimension perpendicular to the plane of the channel axes it is possible to provide printheads of linear density greater than, and indeed substantially greater than, 2 per millimeter. This represents a substantial advance in the competitive pursuit for low cost per channel, high resolution array printheads not subject to the disadvantages referred to of thermal bubble operated devices.

The array disclosed in IBM Technical Disclosure Bulletin Vol. 23 Mar. 10, 1981 has a piezo-electric actuator apparently of disc form mounted in the wall between two adjacent chambers and disposed so as to actuate one chamber upon flexural displacement in one sense and to actuate the other chamber of the pair upon displacement in the opposite sense. The chamber width and inter-chamber spacing are substantial with the result that the chambers are required to converge (in a region away from the actuators) so as to reduce the inter-nozzle spacing.

In the embodiments of the invention herein described acoustic waves are employed in conjunction with electrically actuated displaceable walls which are long, that is they extend the whole or substantially the whole length of the channels from the nozzles 6 to the ink supply manifold. When actuated (as will be seen), the displaceable side walls 11 on one or both sides of a channel compress the ink in the channel. This pressure is dissipated by an acoustic pressure wave travelling from the nozzle. The condensation of the wave acts, for the period of travel of the wave along the length of the channel, as a distributed source the length of the channel which feeds ink under pressure out of the nozzles to expel a drop.

Where a channel and the long narrow actuator, provided by the whole or a part of a side wall 11 extending the length thereof, is combined with an acoustic pump in this way, the volume displacement of the actuator can be distributed so that the wall displacement is small at any section. Typically the actuator wall has an aspect ratio, i.e. the ratio of its width between channels to its height, of 3–30 or more. At the same time the layout is a planar parallel channel configuration, suitable for manufacture in quantity.

In practice the length of the channel along which the acoustic wave travels is limited (only) by the period suitable for drop expulsion, and by the growth of viscous boundary layers in the ink channels. Typically, the length of the channel will be more than 30 and preferably more than about 100 times its width in the channel plane.

When the linear density of the channels in a planar array is increased, it is the result of reducing both the narrow section dimension parallel to the plane of the channel axes and the thickness dimension in the same plane of the common displaceable walls. This causes reduced compliance (CI) of the ink in the channels and increased compliance (CW) of the displaceable walls between channels.

High density of channels consequently means that the compliance of the wall between ink channels is an important aspect of the printhead design, which has not been considered in prior art systems.

The wall compliance, for example, may effect the velocity of sound in the ink along a channel, causing the acoustic velocity to be lower in magnitude than for the ink solvent alone. At the same time, when the displaceable side walls 11 are actuated, the pressure in the ink in the actuated channels is lower with more compliant walls than would be the case with less compliant walls. Additionally, due to compliance, some change in pressure is generated in neighbouring channels which are not actuated. Means to compensate for what might otherwise be a disadvantage of a printhead with displaceable walls are discussed below.

The embodiments of the invention illustrated in FIGS. 2(a), 2(b), 3(a), 3(b) and 4 to 7 show different possible ways of constructing and of operating the transversely displaceable, inter-channel side walls 11. These will be considered in turn.

Figure 2A:
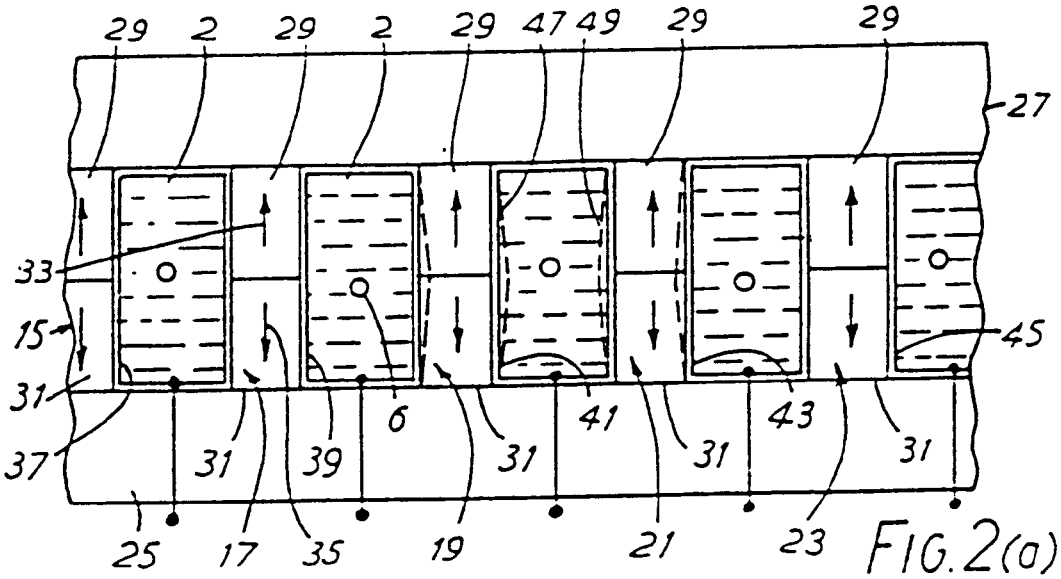
FIG. 2(a) is a fragmentary cross-sectional view similar to that of FIG. 1(b) but to a larger scale and showing a specific printhead according to the invention.
Figure 2B:
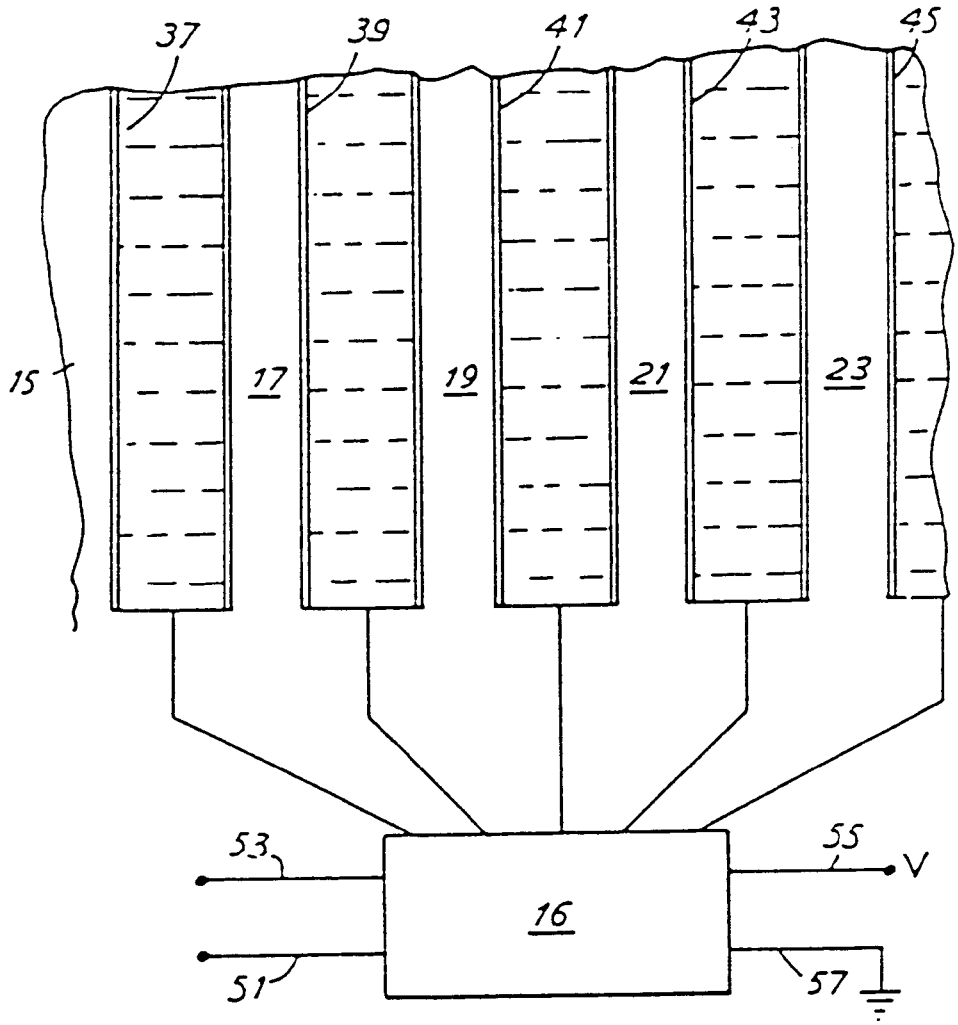
FIG. 2(b) is a fragmentary sectional plan view of the printer of FIG. 2(a) illustrating electrical connections thereof.

In FIGS. 2(a) and 2(b) a printhead is shown which because of its ease of manufacture and electromechanical efficiency is a preferred embodiment of the invention. The array incorporates displaceable side walls 11 in the form of shear mode actuators 15, 17, 19, 21 and 23 sandwiched between base and top walls 25 and 27 and each formed of upper and lower wall parts 29 and 31 which, as indicated by arrows 33 and 35, are poled in opposite senses normal to the plane containing the channel axes. Typically, the distance between adjacent side walls is 0.05 mm and the height of said side wall 0.30 mm. The length of each channel is typically 10 mm or more. Electrodes 37, 39, 41, 43 and 45 respectively cover all inner walls of the respective channels 2. Thus, when a voltage is applied to the electrode of a particular channel, say electrode 41 of the channel 2 between shear mode actuators 19 and 21, whilst the electrodes 39 and 43 of the channels 2 on either side of that of electrode 41 are held to ground, an electric field is applied in opposite senses to the actuators 19 and 21. By virtue of the opposite polling of the upper and lower wall parts 29 and 31 of each actuator, these are deflected in shear mode into the channel 2 therebetween into chevron form as indicated by broken lines 47 and 49. A pressure is thus applied to the ink 4 in the channel 2 between the actuators 19 and 21 which causes an acoustic pressure wave to travel along the length of the channel and eject an ink droplet 7 therefrom. Alternative configurations of shear mode wall actuators which can be employed are considered in co-pending application Ser. No. 140,764, the contents of which are incorporated herein by reference.

It will be seen from FIG. 2(b) that the electrodes 37 to 45, each specific to a channel, are individually connected to the chip 16, to which are also connected a clock line 51, data line 53, voltage line 55 and ground line 57. The channels 2 are arranged in first and second groups of alternate channels and successive clock pulses supplied from clock line 51 enable the first and second groups to be actuated in sequence. The data in the form of multi-bit words appearing on data line 53 determines which of the channels in each of the groups are to be activated and causes, by the circuitry of the chip 16, the electrode of each of those channels in the currently active group to have the voltage V of the voltage line 55 applied to it. The voltage signal actuates both of the actuable side walls of the selected channel; consequently every sidewall is available to operate the channels in each group of alternate channels. The electrodes of the channels in the same group which are not to be activated and the electrodes of all channels belonging to the other group are held to ground.

Figure 2C:
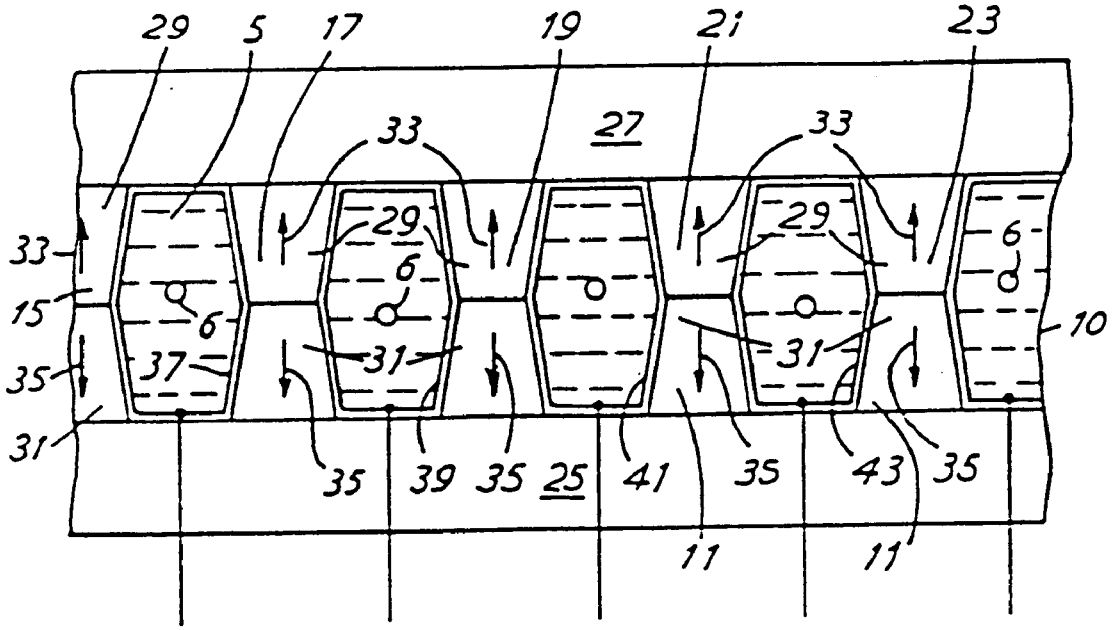
FIG. 2(c) is a view similar to FIG. 2(a) of a modified form of the embodiment of FIGS. 2(a) and 2(b)
Figure 2D:
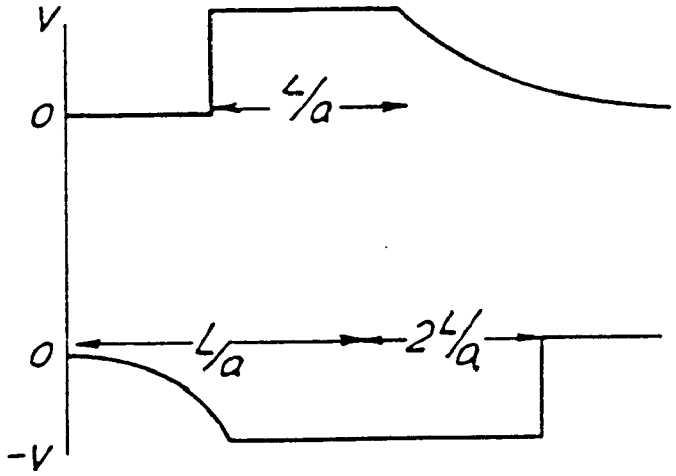
FIG. 2(d) shows voltage waveforms employed for ejecting droplets from the printhead of FIGS. 2(a) and 2(b) or that of FIG. 2(c)

FIG. 2(d) shows two different voltage waveforms which can be used for drop expulsion. In the mode of operation using the first of these waveforms, the electrode of the activated channel is energised by the application of a positive voltage V for a period L/a, where L is the channel length and "a" is the velocity of sound in the ink. The voltage is then allowed to fall relatively slowly to zero. The acoustic wave which travels along the channel from the nozzle end thereof during the period L/a of application of the voltage V causes condensation of the liquid pressure and expels a drop from the nozzle of that channel whilst the negative pressure in adjacent channels causes a rearward movement of the meniscus. Thereafter, as the voltage signal slowly falls to zero the actuated channel walls return to their original positions whilst the original position of the ink meniscus in the nozzle is restored by liquid feed to the channel from the ink reservoir.

In the mode of operation employing the second of the waveforms shown in FIG. 2(d), a negative voltage V is relatively gradually applied, as shown over a period L/a, to the side walls of the actuated channel, this rate of application being less than will cause drop ejection from the channel. The voltage is now held for a period of about 2 L/a when the residual wave pressure in the activated channel, because of flow of ink thereto from the adjacent channels, becomes positive. The voltage (−V) is then instantaneously removed so that the pressure in the channel is increased and a droplet is ejected as the walls thereof are rapidly restored to their original positions. In this mode of operation some of the initial energy is retained in the acoustic pressure waves to assist droplet ejection. Also, the side wall elasticity, which resists the actuator movement during application of the voltage provides energy to generate droplet expulsion following removal of the voltage signal. Wall compliance coupled with the ink further helps to eject the ink droplet during travel of the acoustic wave.

In certain circumstances it may not be appropriate to have a nozzle plate directly abutting the channel ends. Where, for example, two banked arrays of channels are required to print on a single line or where two side-by-side array modules are required to produce constant drop spacing across the module boundary, it may be necessary to have short connecting passages between each channel and its associated nozzle. It is believed important that the volume of any said connecting passage should be 10% or less of the volume of the channel.

Referring now to FIG. 2(c), the embodiment of the invention herein illustrated differs from that of FIGS. 2(a)

and 2(b) inasmuch as the upper and lower wall parts 29 and 31 of side walls 11 taper from the adjoining top wall 27 and base wall 25. The width—transversely to the channels—of the roots of the wall parts 29 and 31 is wider than in the case of the previous embodiment whereas the tips are narrower. So this feature is one way of reducing the compliance of the wall actuators 15–23 or, equally, reducing the mean width that would be occupied by the walls for the same compliance. It will be apparent that the electrical arrangements for operating the embodiment of FIG. 2(c) are the same as illustrated in and described with reference to FIG. 2(b).

The constructions illustrated in FIGS. 2(a), 2(b) and 2(c) can be further modified and operated differently from the mode of operation described. To this end, alternate actuators, say, actuators 15, 19, 23 are made active by having electrodes applied thereto whilst the remaining actuators 17 and 21 are kept inactive either by being de-poled or by not having electrodes applied thereto. With such an arrangement, the electrical arrangement and method of operation is the same as that described below for FIGS. 3(a) and 3(b).

It will be observed that in FIGS. 2(a) and 2(c) the nozzles of alternate channels are slightly offset perpendicularly of the plane of channel axes. This is to compensate for the time difference in droplet ejection from the nozzles of first and second groups of nozzles so that the droplets from both groups are deposited in predetermined locations, suitably on a rectilinear printline.

The method of manufacture of the embodiments of the invention illustrated in FIGS. 2(a), 2(b) and 2(c) involves poling each of two sheets of piezo-electric ceramic material in the direction normal to the sheet and laminating the sheets respectively to the base and top walls 25 and 27 which are of inactive material, suitably, glass. The direction of poling is in both cases towards the glass. Parallel grooves are then cut in the sheets of piezo-electric ceramic material by rotating, parallel, diamond cutting discs or by laser cutting. These grooves extend through to the top or base wall, as the case may be, such grooves each providing half a channel of the finished printhead. In the case of the version illustrated in FIG. 2(c), the grooves are cut by laser or by profiled cutting discs. The parallel grooves are arranged to open to one end of the corresponding ceramic sheet but stop short of the other end. At the inner groove ends a transverse groove is cut to form an ink manifold. A hole is now drilled in a side of one of the ceramic sheets to receive the pipe 14 for the connection of the ink manifold with an ink reservoir. The exposed areas of the piezo-electric ceramic material and adjoining top or bottom wall surfaces are coated in known manner with metal in a metal vapour deposition stage to form electrodes. In the case where electrodes are not applied to all channel walls, selective metal coating is effected by masking. The metal on the top surfaces of the side walls, that is to say the surfaces disposed parallel to the channel axes, is now removed and those surfaces of the respective halves of the structure are then bonded together to form the channels 2 between the integral side walls 11 so formed. At a suitable stage in the manufacturing procedure, a passivating insulator layer is applied over the electrode coating in the channels. The nozzle plate 5 is then secured in position at one end of the channels whilst, at the other end of the channels the electrical connections are made to the chip 16 from the electrodes coating side wall surfaces of the channels. The chip 16 is positioned in a recess cut in one of the ceramic sheets rearwards of the cross channel 13 in the other of the ceramic sheets.

A method of manufacture of the embodiments of FIGS. 1 and 2 above uses operations working simultaneously on large numbers of parallel chains in an array plane. As explained above this enables production costs per channel to be reduced.

In certain product configurations, however, it may be convenient to assemble the arrays using a sandwich construction. For example, where multiple banks of channels are assembled in a single printhead, each layer of the "sandwich" may provide one or two channels of each bank. Embodiments showing each method of working are described in this document but it will be understood that each method can be adapted to any of the constructions described.

Figure 3A:
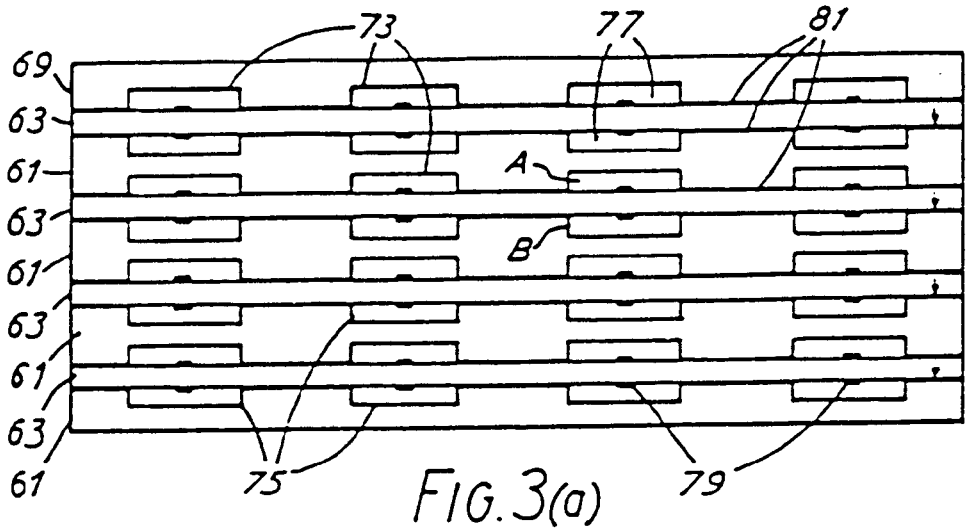
FIG. 3(a) is a cross-sectional view showing a further specific form of printhead according to the invention providing a two dimensional array of channels.
Figure 3B:
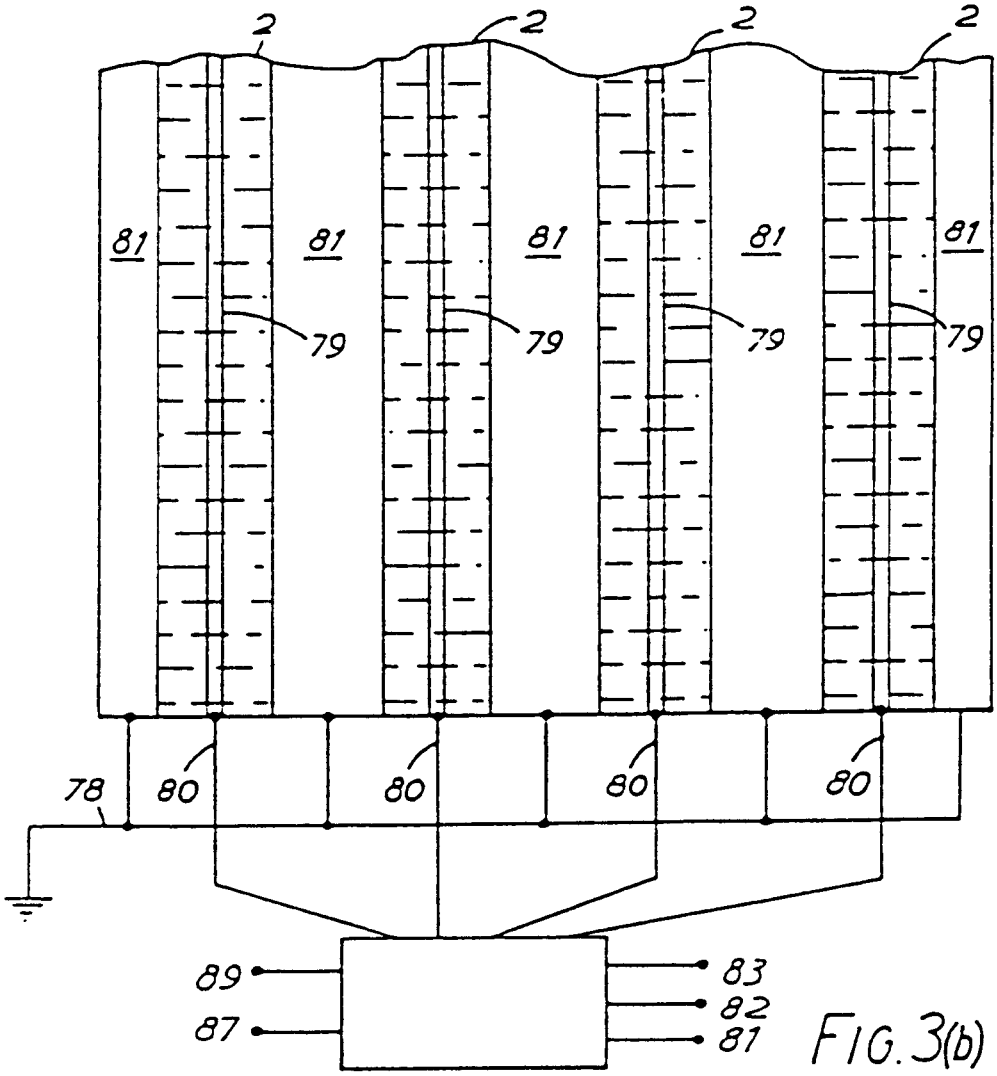
FIG. 3(b) is a fragmentary sectional plan view of the printhead of FIG. 3(a) illustrating electrical connections thereof.

With reference to FIGS. 3(a) and 3(b), there will now be described an embodiment which exemplifies the sandwich form of construction in a multiple bank printhead. As shown in FIG. 3(a), inactive layers 61 alternate with layers of piezo-electric material 63 in a sandwich construction. The piezo-electric material is poled in the thickness direction, that is to say in the direction of arrow 65. The stack of layers is closed by a top inactive layer 69 and a bottom inactive layer 71. A series of parallel grooves 73 are cut in the lower surface of each inactive layer 61 and of the top inactive layer 69. Similarly, a series of parallel grooves 75 is cut in the top surface of each inactive layer 61 and in the top surface of inactive bottom wall 71. It will be understood that in this way, rectangular channels 77 are formed which are bounded on three sides by inactive material and on the fourth side by piezo-electric material.

Within each channel 77, a central electrode strip 79 is deposited on the facing surface of the piezo-electric material. Further electrodes 81 are established on each piezo-electric layer surface at the lands of inactive material intermediate the channels. In one example, the electrodes 81 are all connected to ground.

The channels 77 can be regarded as grouped into pairs in the vertical array direction. The channels of each pair are then divided by a common displaceable side wall formed by the intervening piezo-electric layer. The central electrode 79 for both channels of the pair are interconnected and it will be seen that the application of a positive or negative voltage to these electrodes will establish an electric field transverse to the direction of poling of the piezo-electric material which will deflect upwards or downards as appropriate to increase pressure in the selected channel.

In this configuration, where channels are grouped into pairs sharing the common actuating wall that divides them, there is more than one way of assigning channels into groups. One option is to assign, by analogy with the previously described embodiment, all even numbered channels in one vertical line to one group and all odd numbered channels to the other group. This meets the requirement that both channels of one pair are never simultaneously called upon to eject a droplet. This requirement can be met in other ways, however, and there is some advantage in a scheme in which each group of channels is formed from alternately left and right hand channels of successive channel pairs.

For example:

| GROUP | CHANNEL NUMBERS | | | | |
|---|---|---|---|---|---|
| 1 | 1 | 45 | 89 | | |
| 2 | 23 | 67 | | 10 | 11 |

An advantage of this scheme is that if, for example, channels 2 and 3 are actuated simultaneously, they will apply equal and opposite pressure to the inactive wall between them. The simultaneous actuation of two such neighbouring channels 2 and 3 does not of course happen every time, but the event is sufficiently common for the described advantage to be significant.

The nozzles for the channels 77 are not shown in the drawings. If necessary, an offset can be introduced between alternate channels in a vertical direction to compensate for the time difference between drop ejection from the channels of the two groups. The spatial offset will be in the direction of relative movement between the print surface and the described array; this direction may be a vertical, horizontal or oblique.

FIG. 3(b) shows how the electrodes are connected at the channel ends remote from the nozzles, in the case of electrodes 81, by way of conductors 78 to ground and in the case of electrodes 79 by way of conductors 80 to the power chip 16. The chip has voltage lines 82, 83 and 84 of +V, −V and zero respectively connected thereto as well as clock line 87 and data line 89.

Because one actuator operates a pair of channels and this pair is isolated by inactive layers 61 on either side from the operation of the other channels in the vertical array, the description is now confined to the operation of an adjacent pair of channels marked A and B operated by the actuator therebetween and isolated by the inactive walls on opposite sides thereof. The signals which operate these channels are initiated by a 2 bit data word supplied in a particular print cycle via the data track 87 to the drive circuit chip 16. This in turn generates one of four voltage pulse waveforms of voltage range ±V and applies them to the actuator via track 80.

Figure 3C:
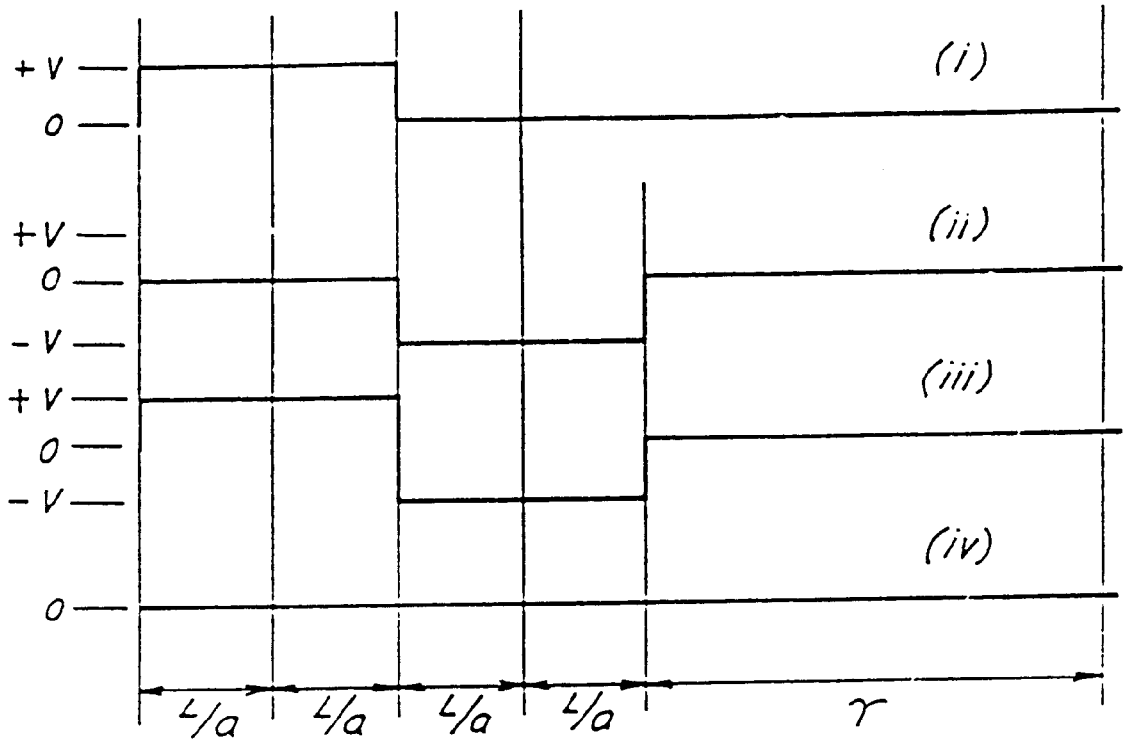
FIG. 3(c) shows voltage wave forms for operating the printhead of FIGS. 3(a) and 3(b)

The 2 bit data word causes the drive circuit chip to produce one of four voltage signals depending on whether the channel pair is to print from both, the upper, lower or neither channel. The four alternative voltage signals are illustrated in FIG. 3(c) and are supplied to those of the alternatives of the channels to be actuated in the first or second group of channels, the clock pulses from line 87 determining which group is to be operational at any particular instant.

When only the first channel A is to generate a drop, the signal (i) is generated. This comprises a voltage pulse of magnitude V applied for two consecutive periods L/a and then restored to zero. The response of the actuator and the travelling pressure waves in the ink channels in response to the signal (i) is now considered, the description being limited to the lossless (zero viscosity) case.

When the voltage pulse V is applied to the actuator in the pair of channels, A,B the resulting displacement generates instantaneously at time zero a positive unit pressure (+p) in one channel and an equal negative unit pressure (−p) in the other. These pressure are dissipated by travelling acoustic step pressure waves which propagate along the channel from the ends. A drop is consequently expelled in time L/a from the first channel nozzle aperture: at the same time ink flows from the back of this channel round into the channel A: and the ink meniscus in the nozzle in the second channel is also drawn inward. After period L/a the pressure in the first channel after expelling a drop is a negative pressure and the pressure in the second channel is a positive pressure of magnitude depending on the reflection co-efficient of the pressure waves at the channel ends and the acoustic wave attenuation.

In the second period, since the actuator wall remains displaced during the second period L/a, the travelling pressure waves continue to propagate in each channel. The ink meniscus in the first channel is now drawn inward and at the same time ink flows into the channel at the back end from the second channel due to the prevailing negative pressure. Meanwhile ink flows out refilling the aperture in the second channel and from its back end so that after period 2 L/a the pressures again become +ve in the first channel and −ve in the second.

The ink meniscus in the aperture of the first channel has now withdrawn by approximately the volume of one drop from its initial condition due to the expulsion of a drop. The ink meniscus in the aperture of the second channel after receding has returned after period 2 L/a to its initial position.

At the time 2 L/a the voltage signal is cancelled and the actuator returns to its rest position. This substantially extinguishes the pressures in each channel and arrests the expulsion of further ink from either aperture. The wave form in FIG. 3(c) (i) therefore expels an ink drop only from the first channel. After the refill period T the ink is drawn back to equilibrium by surface tension so that the ink has recovered its datum position in each channel and further printing may proceed.

Waveform (ii) is that used to expel a drop only from the second channel B. This involves application of a negative voltage pulse for period 2 L/a and works identically with the application of the signal in FIG. 2(a) and does not require full description.

Waveform (iii) is that used to expel drops from the apertures in both channels. The waveform is simply the two previous waveforms (i) and (ii) applied on after the other, and is complete after period 4 L/a. The trivial case that no drop is expelled from either channel when no actuation signal is applied is shown for completeness as waveform (iv). The period L/a is comparatively short so that the refill period T has greater significance in defining the minimum period of the print cycles than the period L/a of the travelling waveform.

Figure 4:
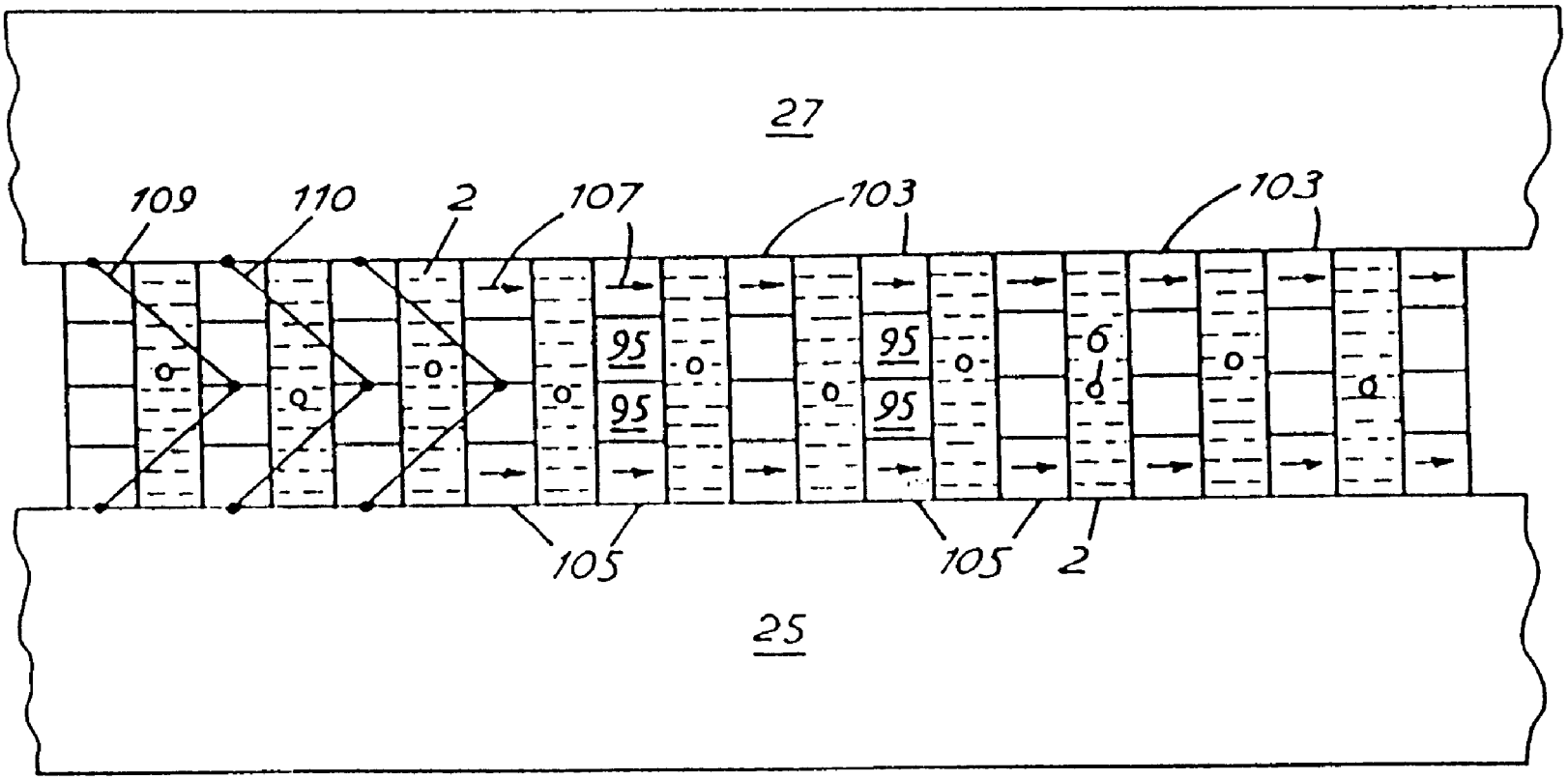

Referring now to FIG. 4, there is illustrated an embodiment which operates broadly in the same way as is described in connection with FIGS. 2(a) and 2(c), and therefore uses the electrical arrangement of FIG. 2(b), but employs shear mode actuators generally of the form discussed in relation to FIG. 3(a). The actuators are provided in every wall of the array between the top and bottom walls 27 and 25 which, suitably, are of glass. The electrodes take the form of two stiff metal, suitably, tungsten blocks 95. One block 95 is provided at the tip of the actuator wall part 97 extending from top wall 27 and the other at the tip of actuator wall part 99 extending from bottom wall 25. Electrodes 103 and 105 (equivalent to electrodes 81 of FIG. 3(a)) are located, as to electrodes 103, between the wall parts 97 and top wall 27 and, as to electrodes 105, between wall parts 99 and bottom wall 25. The poling direction of the wall parts 99 and 97 is parallel with the bottom and top walls and is indicated by arrow 107. Accordingly, the electric field applied to the poled wall parts is normal to the bottom and top walls 25 and 27. The electrode connections are made at the ends of the channels remote from the nozzles 6 by three point connections via connectors 109, 110. As shown, connectors 109 connect a line at potential zero to electrodes 103 and 105 of one actuator wall and to the blocks 95 of an adjacent actuator wall. Connectors 110 connect a line at potential V to electrodes 103 and 105 of one actuator wall and also to blocks 95 in the next adjacent actuator wall.

The channels 2 are, as in the case of FIG. 2(a) and 2(b) arranged in first and second group of alternate channels, the electrical connections providing as described for that embodiment for switching of voltage V or zero to selected channels of each group in order to operate both side walls of each actuated channel.

The manufacture of the embodiment of FIG. 4 is performed in the array plane in a generally similar fashion to that of the embodiments of FIGS. 2(a) and 2(c). First each of the bottom and top walls 25 and 27 has applied thereto a layer of metal comprising the electrodes 105 and 103 using a masking technique to limit metal deposition to the places required. A layer of piezo-electric ceramic poled in the direction of arrows 107 is then bonded to each of the bottom and top walls. To each of said piezo-electric layers is then bonded a plate of tungsten or other suitable stiff metal. Parallel grooves are cut into each of the two multi-layered structures so formed and a transverse groove is formed to unite common ends of the channel grooves. The surfaces of the metal plates parallel with the bottom and top walls are then bonded together to form the channels 2. The nozzle plate 5 is thereafter secured at one end of the channels and at the other end thereof the three point electrical connectors are attached and leads are taken therefrom as before described to the chip.

Figure 5:
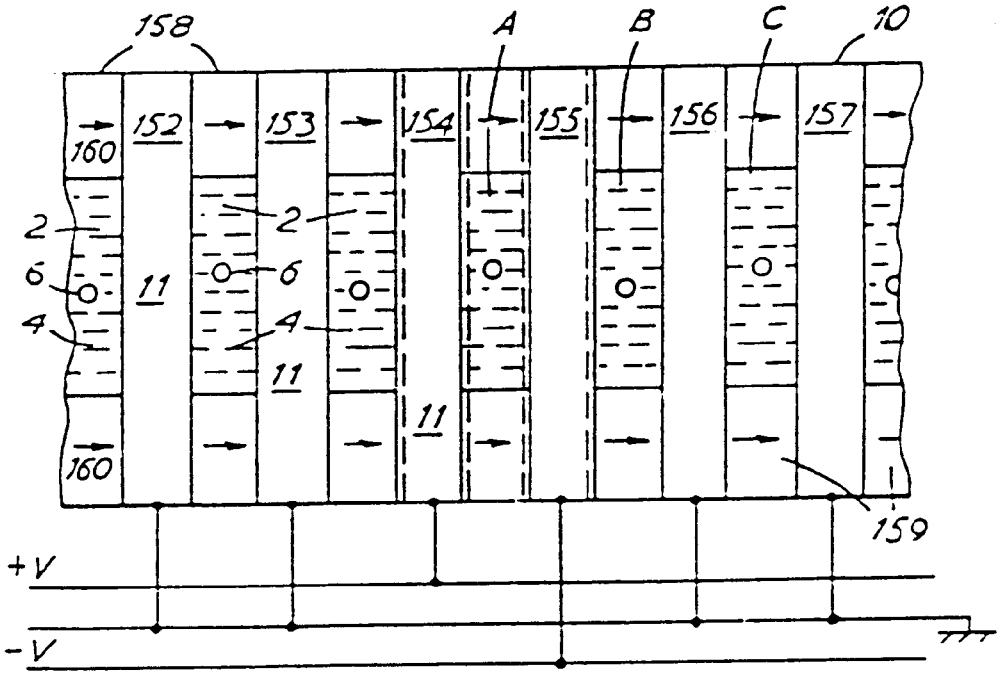
FIGS. 4, 5, 6 and 7 are cross-sectional views similar to FIGS. 2(a) and 3(a) showing further embodiments of the invention.

Referring now to FIG. 5, there is illustrated an alternative embodiment in which walls 152 to 157 are assembled in a sandwich construction by parallel strips 158, 159 of piezo-electric ceramic. Each channel 2 is bounded by adjacent side walls and by a pair of piezo-electric strips 158 and 159. The walls are conducting or having conducting electrodes applied to their surfaces in contact with the piezo-electric strips so as to form field electrodes. Poling of the piezo-electric strips is in the direction of the arrows 160, that is to say in the field direction. According, application of a field causes the piezo-electric strips to expand or contract in thickness (depending upon the polarity) and thus either draw together or force apart the adjoining walls.

To take the example in which it is desired to eject an ink droplet from the channel marked A, the opposing walls 154 and 155 (or the electrodes on both faces thereof) are connected respectively to the +V and −V rails as shown in the Figure. Also as shown, the other walls 152, 153, 156 and 157 are connected to the ground rail. In this way a potential of +2 V is applied in the same sense across both the piezo-electric strips associated with channel A causing these to contract and pull together the adjoining walls 154 and 155. A positive ink pressure is therefore generated in the desired channel. Since the piezo-electric strips between walls 153 and 154 and between walls 155 and 156 (that is to say the piezo-electric strips in the channels at either side of the channels of interest) receive a potential −V, they expand to permit movement of the walls 154 and 155 with no net change in overall dimension of the printhead.

If a droplet is required to be ejected simultaneously from the next channel to A in the same group, for example channel C, wall 156 is connected to the +V rail and wall 157 to the −V rail. In this case the piezo-electric strips between walls 155 and 156 receive a potential at −2 V so that they expand to accommodate both the leftward movement of wall 155 and the rightward movement of wall 156. The behaviour of the remaining walls is as described above. This embodiment is another where every sidewall is available to actuate the channels in each group.

Whilst this embodiment utilises the expansion or contraction of piezo-electric elements in the 3—3 mode, the skilled man would appreciate that an alternative arrangement could be employed utilising the 3—1 mode of deformation. In each case the employment of a sandwich construction is favoured.

Figure 6:
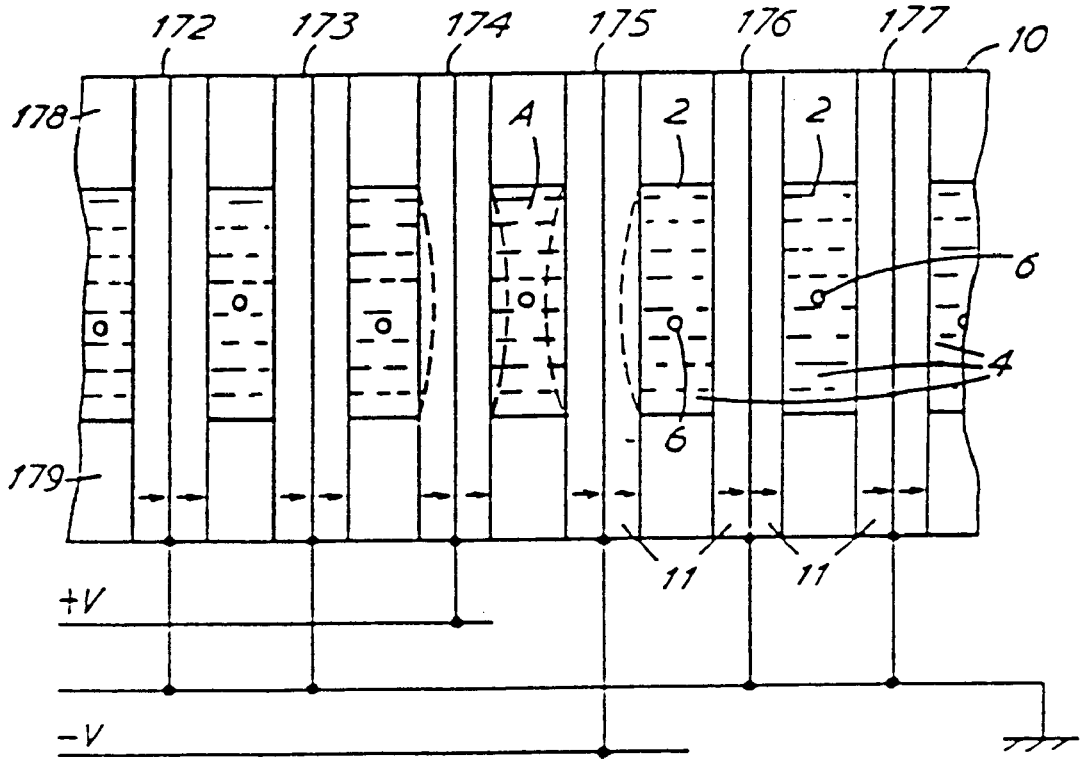

A still further embodiment of this invention is illustrated in FIG. 6. This employs bimorph walls 172 to 177 of thickness poled piezo-electric material. These walls are separated by conducting spacer blocks 178 and 179 which are electrically connected to ground. Each channel 2 is defined between adjacent bimorph walls and the interposed spacer blocks. Each bimorph piezo-electric wall has a central electrode 180 to which voltages of +V, O, or −V can be applied. By way of example, if it is desired to eject a droplet from the channel marked A, voltages of +V and −V respectively are applied to the central electrodes 180 of the actuator walls 174 and 175. These accordingly distort in flexure in opposite senses inwardly of the channel A. This is illustrated in dotted outline in the Figure. There is accordingly a positive ink pressure generated in the channel A to eject a droplet.

Figure 7:
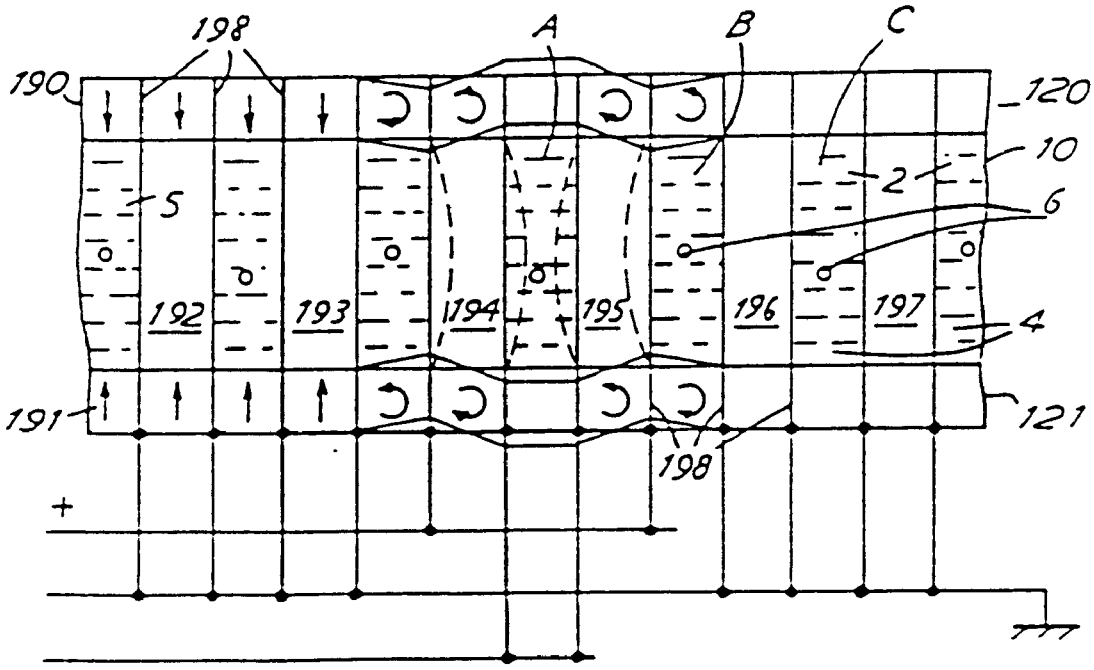

Turning now to FIG. 7, two sheets of piezo-electric ceramic 190 and 191 are thickness poled and support between them a parallel stack of walls 192 to 197. Adjacent walls serve to define the channels 2. Each piezo-electric sheet 190, 191 is provided with an array of electrodes 198 formed, for example, by parallel saw cuts in the piezo-electric ceramic being filled with metal. The electrodes 198 are arranged to lie at the wall/channel interfaces and corresponding electrodes in the upper and lower sheets 190 and 191 are interconnected in a suitable manner.

The mode of operation of the embodiment of FIG. 7 involves the shear rotation of sections of the piezo-electric ceramic applying bending moments to the walls on opposite sides of the channel of interest, so as to flex the walls inwardly of the channel. This operation will be described in more detail, taking as an example, the ejection of an ink droplet from the channel marked A which lies between walls 194 and 195. As shown in FIG. 7, the electrodes 198 at either edge of channel A are held at −V; the next two outward electrodes are held at +V whilst all other electrodes are held at ground. Considering the piezo-electric ceramic sections lying between walls 193 and 194, these receive a potential of +V and undergo a rotation in the arrowed direction. The piezo-electric ceramic sections carrying the wall 194 receive a potential of −2 V and thus undergo a double rotation in the opposite sense. The piezo-electric ceramic sections between walls 194 and 195 are not subject to a field and accordingly do not rotate, although they are displaced outwardly by the action of neighbouring sections. It will be seen in this manner that upper and lower ends of wall 194 have bending moments applied thereto causing the wall to flex towards the position shown in dotted outline. In analagous fashion, wall 195 is caused to flex in the opposite sense leading to a positive pressure change in the channel A.

If it is required to eject a droplet simultaneously from the next channel in the same group, for example the channel marked C, the electrodes on either side of the channel receive a potential of −V whereas the next two outward electrodes receive a potential of +V. The wall behaviour is analogous with that just described except that the piezo-electric section between walls 195 and 196 has zero rather than −V potential applied. Accordingly this section no longer undergoes a rotation but—as would be expected of the central section between two actuated channels—merely moves laterally to accommodate the rotations of its neighbours.

It is convenient at this stage to compare the embodiments so far described. Aside from the constructional variations, the embodiments can be grouped into two broad classes according to the manner in which selected channels are energised.

In the first class, comprising the embodiments of FIGS. 2 and 4 to 7, every wall in the channel array is displaceable and the necessary pressure change in each selected channel is brought about through transverse displacement of both side walls of the channel. This is the so-called "every line active" mode, (ELA) and provides a number of advantages. In the example of FIG. 2, with the opposing electrodes of both side walls in each channel remaining at the same potential, a common electrode can be formed for each channel by plating all internal surfaces of the channel. In manufacturing terms, this is considerably simpler than forming separate electrodes on opposing side walls of the channel. A further advantage is that with both walls participating in droplet ejection from a channel, maximum use is made of the piezo-electric material available in the printhead, and the actuation energy is lowered.

An alternative mode of wall actuation is where each channel has one displaceable side wall, the other side wall remaining fixed or inactive. This is the so-called "alternate lines active" mode (ALA). It is exemplified by the embodiment of FIG. 3 and by the described modification to the FIG. 2 embodiment in which alternate actuating walls are rendered inactive by, for example, de-poling. As with the ELA mode, the ALA mode can be driven in a unipolar manner, that is to say with connections to a ground and one voltage rail, or bipolar, with ground, +V and −V rails. Unipolar drive circuitry is simpler but the number of track connectors in the ALA mode is reduced if a bipolar drive arrangement is used.

It will be recognised that a particular wall construction can usually be driven in either of the ELA or ALA modes and a design choice will be made depending upon the circumstances.

It has been mentioned previously that the compliance of the walls between channels becomes an increasingly important factor as channel density is increased. By "compliance" is meant here the mean displacement in response to ink pressure. The relative compliance of the wall as compared to the compliance of the ink affects operation of the printhead in a number of related ways. The electro-mechanical coupling efficiency is critically affected by the compliances, so also is the degree of cross-talk between neighbouring channels. In terms of energy efficiency, it is important to match the compliance of the ink (CI) with the compliance of wall (CW) and to optimise these with regard to other channel parameters, particularly the nozzle.

Energy efficiency is not, however, the only design criterion of importance to compliance considerations. It is found that cross-talk between channels increases markedly as relative wall compliance increases. Clearly, it is important that an ink droplet should be ejected from only those channels that are selected and the pressure generated in neighbouring channels through cross-talk must be kept safely below the levels associated with drop ejection.

Prior to the making of this invention, the problem of cross talk was a factor regarded as placing an upper limit upon channel density. It is interesting to note, for example, that the array disclosed in IBM Technical Disclosure Bulletin Vo. 23 March 10, 1981 was shown having a wall thickness between actuator-sharing chamber pairs which is still greater than that of the wall accommodating the actuator. This was a method of reducing cross talk.

Figure 8:
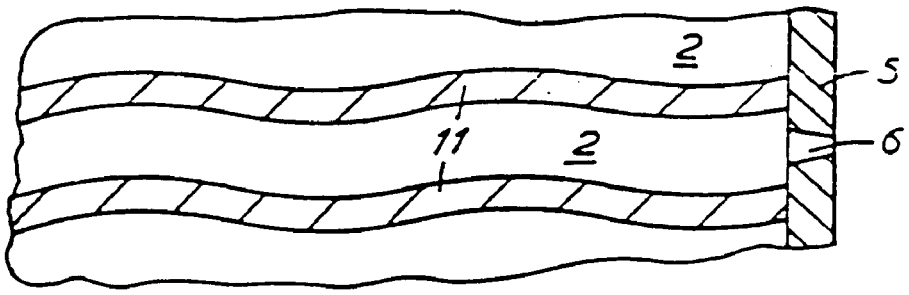
FIG. 8 is a sectional plan view of a modification applicable to the embodiments of FIGS. 2(a) and 2(b), FIGS. 3(a) and 3(b), FIGS. 4, 5, 6 7 and 9.

Certain methods have been described earlier in this document for reducing wall compliance. The shape of each wall can be varied to increase stiffness and the thickness and nature of the electrode layer applied to the walls can also usefully be varied to increase stiffness. It is also practical to coat each actuating wall with a rigid insulator such as silicon carbide or tungsten carbide which are both about thirteen times as stiff as PZT. A still further option to stiffen the actuator walls is to corrugate them so that the channels are not straight, but slightly sinuous. This modification is illustrated in FIG. 8 which shows in schematic form, actuating walls 11 of sinous form arranged so that the channel 2 between them remains of constant width. Such methods are particularly applicable to actuators which deform in shear mode, since flexural rigidity is increased independently. There is thus no increase in the voltage required to produce a required displacement in shear mode.

As an alternative to reducing wall compliance, this invention proposes techniques for increasing the compliance of the ink. One such technique will now be described with reference to FIG. 9. In its operating characteristics, this embodiment is very similar to that of FIG. 2(a). However, the channels in this case extend a significant distance into the glass substrate. As will be apparent from the FIG. 9, alternate channels are extended into the bottom wall 25 and top wall 27 respectively. This construction is achieved simply by increasing the depth of cut of the disc, laser device or other cutting system used to produce the channel in the piezo-electric sheet so as to cut a slot not only in the sheet itself but also in the underlying glass substrate.

By extending each channel laterally in this way the compliance of the ink CI is increased with the same effect upon the ratio CI/CW as is achieved by stiffening the walls. It will be understood that methods spoken of as increasing relative wall compliance may be used to reduce mean wall thickness for the same compliance and therefore produce a printhead design of increased linear channel density.

Figure 10:
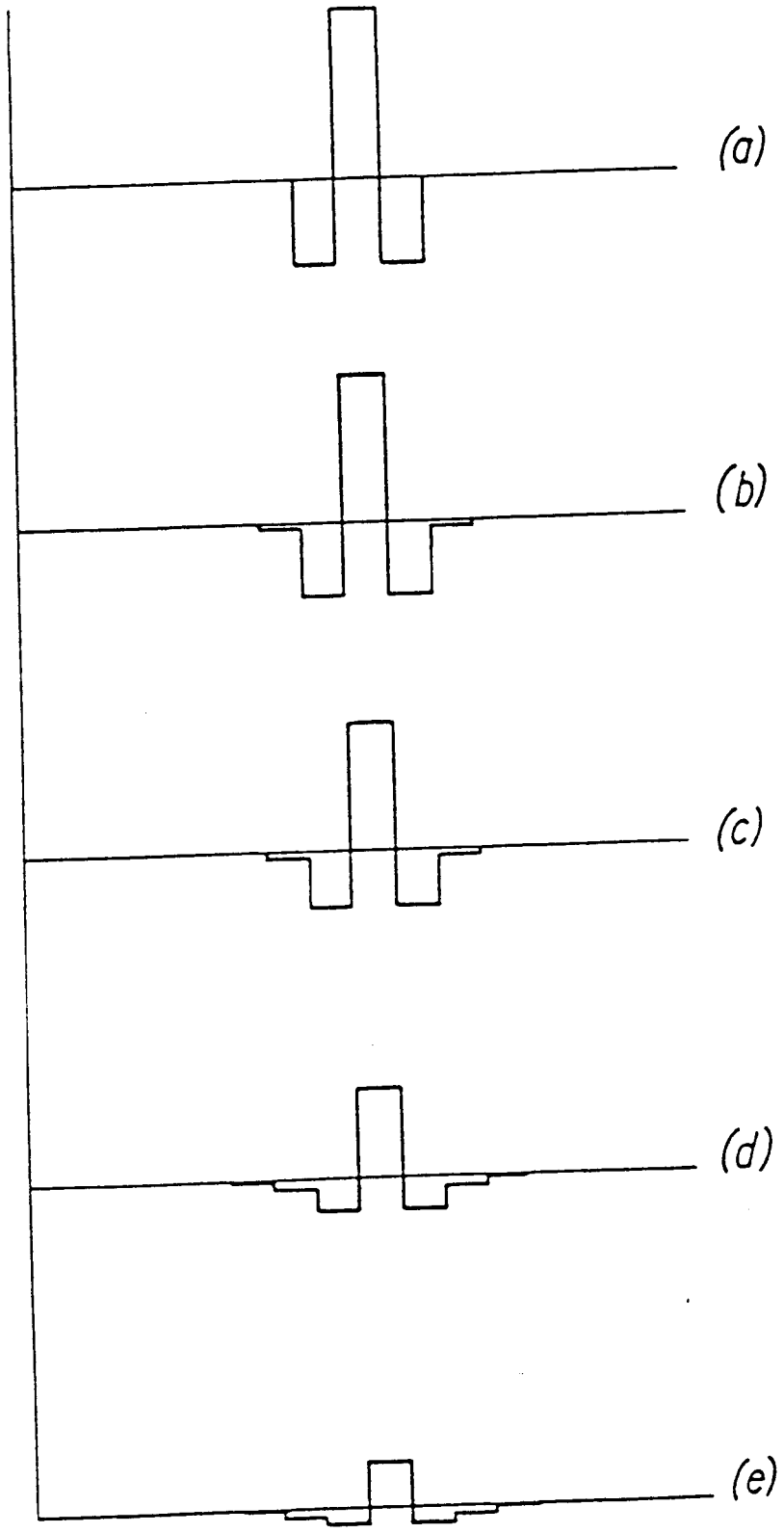
FIG. 10 is a series of graphs illustrating the effect of compliance changes on pressure changes in neighbouring channels.

The influence of the ratio CI/CW is described with reference to FIG. 10. This is a graphical representation of the fluid pressure arising in neighbouring channels upon energisation of a single channel $P_o$ when both side walls are energised. The notation employed is that $P_{-1}$ and $P_1$ represent immediate neighbour channels, $P_{-2}$ and $P_2$ next following channels, and so on. In the theoretical case of entirely rigid walls, CI/CW is infinite. As shown in FIG. 10(a) a positive pressure at +2 arbitrary units is produced in channel $P_o$ and negative pressures of −1 in neighbouring channels $P_{-1}$ and $P_1$. There is zero pressure change in channels $P_{-2}$ and $P_2$, which are of course the immediately adjacent channels in the group containing $P_o$, so as would be expected there is no cross-talk. FIGS. 10(b) to 10(d) illustrate the effect of varying CI/CW to assumed values of, respectively, 18,8,3 and 1. It will be seen that as the ratio CI/CW decreases, that is to say with the walls becoming increasingly compliant in relative terms, the relative pressure increases in group neighbour channels $P_{-2}$ and $P_2$. The influence of compliance is also to reduce the pressure $P_o$ and energy stored in the ink and to increase energy stored in the walls. It will be recognised that size and velocity of a droplet being ejected from say the $P_2$ channel is reduced particularly if channels $P_o$ and $P_4$ are actuated simultaneously. It should be noted, however, that the cross-talk effect is substantially restricted to immediate group neighbours, even at a wall compliance equal to the compliance of the ink. This somewhat surprising result enables high density arrays to be produced with the problem of cross-talk remaining of manageable proportion.

Figure 9:
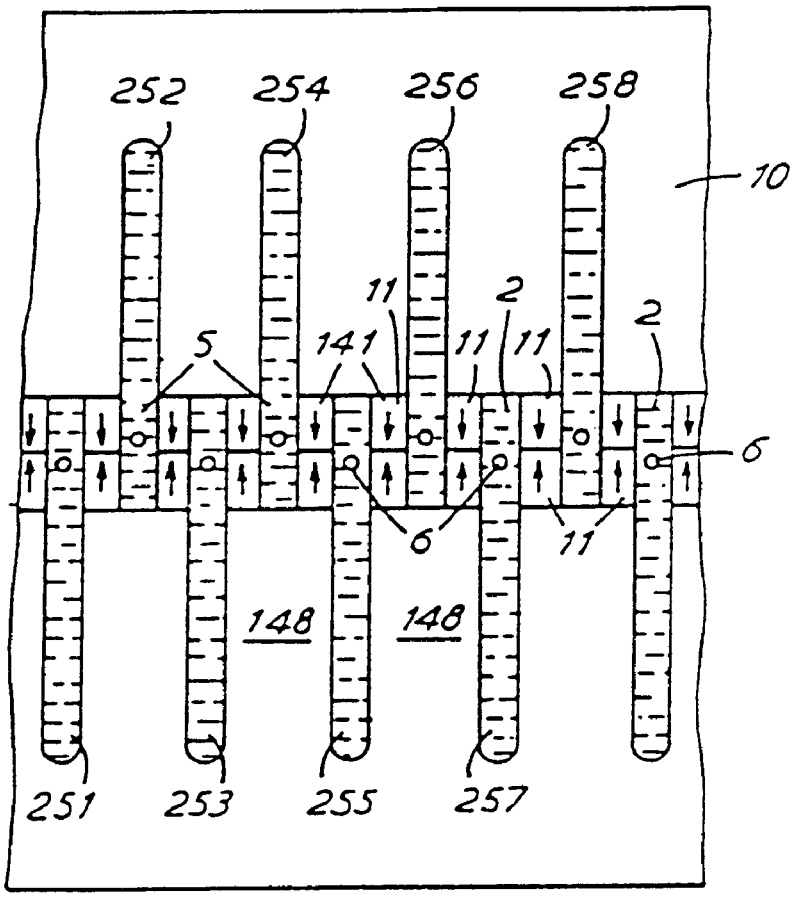
FIG. 9 is a cross sectional view similar to FIGS. 2(a) and 3(a) illustrating a further embodiment of the invention.

A still further method of compensation will be explained with reference to FIG. 9. If extended channel 254 is actuated, a positive pressure P will result in a negative pressure −P/a in the physically neighbouring channels 253 and 255. The group neighbour channels 252 and 256 will be subject, to negative pressures −P/b. Now, upon suitable choice of material, dimension and the like, it can be arranged that the cantilever beam substrate portions lying between channel 254 and its group neighbours 252 and 256, will deform under the action of the pressure differential between channels, so as to generate a pressure +P/b and compensate the negative pressure −P/b. In this way the problem of cross-talk can be eliminated, thereby removing the disadvantage that may be considered to arise from an array with compliant walls. A design configuration can accordingly be selected which is based on considerations of channel density and energy efficiency without regard to interchannel cross-talk within a group of channels.

It should be understood that this invention has been described by way of example and a wide variety of modifications are possible without departing from the scope of the claims. With regard to piezo-electric material, for example, PZT is preferred although it would be possible to use other ceramic materials such as barium titanate, or piezo-electric crystalline substances such as gadolinium molybdate or Rochelle salt. The piezo-electric material may be used as a layer upon a substrate of which glass has been described as an example but for which numerous alternatives will appear to the skilled man. Alternatively, blocks of piezo-electric material can be employed in place of the described layered or laminate structures with the piezo-electric walls then being integral with the supporting base wall. An advantage of the structure in which a piezo-electric side wall is mounted upon a glass or other electrically insulated substrate is that electrical cross talk between channels of the array is reduced as is the problem of stray fields causing unwanted distortion of a base wall formed of piezo-electric material.

It should be understood that the channels or apparatus according to this invention whilst parallel, need not have their axes lying precisely in a common plane. It has been described how offset channels can offer advantages. Generally, the parallel channels should be spaced in an array direction. In apparatus affording a two-dimensional array channels, it should be noted that the array direction need not necessarily be normal to the direction of relative movement. Indeed, the advantages have been explained of increasing channel density in an array direction which is parallel to the direction of relative movement of the print surface.

The specific description of this invention has been confined largely to pulsed droplet ink jet printers. Whilst references have been made to "paper", it should be understood that this term has been used generically to cover a variety of possible print surfaces. More generally, the invention embraces other forms of pulsed droplet deposition apparatus. For example, such apparatus may be used for depositing photo-resist, sealant, etchant, dilutent, photo-developer, dye and the like.

We claim:

1. A high density multi-channel array, electrically pulsed droplet deposition apparatus, comprising a multiplicity of parallel droplet liquid channels, mutually spaced in an array direction normal to the length of the channels, each of said channels extending in a lengthwise direction and being separated from a like channel by a side wall which is transversely displaceable in opposite senses and which extends in the lengthwise direction of the channels, and in a direction which is both normal to said lengthwise direction and normal to the array direction, respective nozzles opening into said channels for ejection therefrom of droplets of liquid, connection means for connecting said channels to a source of droplet deposition liquid and electrically actuable means located in relation to said channels for effecting in each channel selected for actuation, transverse displacement generally parallel to said array direction of said transversely displaceable side wall of said selected channel to cause change of pressure in said selected channel to effect droplet ejection from the nozzle opening thereinto, *wherein said electrically actuable means comprises for each said side wall a uniform body of piezoelectric material forming part of the side wall and adjoining each of said channels separated by said side wall and electrode means for applying a field to the piezoelectric material.*

[2. Apparatus as claimed in claim 1, wherein said electrically actuable means comprises piezo-electric material forming part at least of a wall adjoining each of said channels and electrode means for applying a field to the piezo-electric material.]

[3. Apparatus as claimed in claim 1, wherein said electrically actuable means comprises piezo-electric material forming at least part of each side wall and electrode means for applying a field to the piezo-electric material.]

4. Apparatus according to claim [3] *1*, wherein said piezo-electric material is displaceable under the action of the applied field in shear mode.

5. Apparatus according to claim 1, wherein substantially every channel side wall is displaceable in respective opposite senses and is common to two adjacent channels.

6. Apparatus according to claim 1, wherein [the] *a* compliance of the side walls is such that [the] *a* magnitude of the pressure changes arising in neighbouring channels as a result of side wall compliance on actuation of a selected channel represents a significant proportion of the magnitude of the pressure change in the selected channel.

7. Apparatus according to claim 1, wherein each electrically actuable means serves on selected actuation of any channel to effect transverse displacement of at least part of both side walls of the channel one toward the other.

8. Apparatus according to claim 7, wherein said electrically actuable means comprises piezo-electric material forming at least part of each channel side wall and common electrodes are provided one for each channel for applying a field to the piezo-electric material of the side wall.

9. Apparatus according to claim 8, wherein each said common electrode comprises an electrode layer covering substantially all internal surfaces of the corresponding channel.

10. Apparatus according to claim 4, wherein said piezo-electric material is disposed in two regions coextensive longitudinally of the channel and mutually spaced normal to said array direction, the direction of poling with respect to the applied electric field in each region being such that the said wall part undergoes deformation generally to chevron form.

11. Apparatus according to claim 10, wherein said regions are substantially contiguous.

12. Apparatus according to claim 10, wherein said regions are connected through an inactive wall part.

13. Apparatus according to claim 1, wherein the length of each channel is at least 30 times greater than the mean dimension of the channel in the array direction.

14. Apparatus according to claim 1, wherein the length of each channel is at least about 100 times greater than the mean dimension of the channel in the array direction.

15. Apparatus as claimed in claim 1, wherein, in [the] *a* cross section of said channels, the extent of said transversely displaceable side walls in the direction normal to said array direction is substantially greater than the mean dimension of said channels in said array direction.

16. Apparatus according to claim 15, wherein said extent of said transversely displaceable side walls is from 3 to 30 times greater than said dimension of the channels.

17. Apparatus according to claim 1, wherein, in the cross section of said channels, the extent of said side walls in the direction normal to said array direction is substantially greater than the mean dimension of said side walls in said array direction.

18. Apparatus according to claim 17, wherein said extent of the side walls is from 3 to 30 times greater than said dimension of side walls.

19. Apparatus according to claim 17, wherein each sidewall is shaped to reduce the mean displacement thereof in the array direction in response to pressure difference between the channels adjacent the side wall, compared with a rectangular cylindrical side wall of the same means dimension in the array direction.

20. Apparatus according to claim 19, wherein the dimension of each sidewall in the array direction reduces inwardly of the channel cross section.

21. Apparatus according to claim 19, wherein said side walls are sinuous in a plane containing both the channel lengths and said array direction.

22. Apparatus according to claim 17, wherein each sidewall is provided with means [to reduce] *for reducing* the mean displacement thereof in the array direction in response to pressure difference between the channels adjacent the side wall, compared with a rectangular cylindrical side wall of the same mean dimension in the array direction.

23. Apparatus according to claim 4, including means comprising a surface layer provided on the piezo-electric material of a material stiffer than the piezo-electric material [to reduce] *for reducing* the compliance of the piezo-electric material to pressure in the channel without substantially affecting the compliance of the piezo-electric material to shear.

24. Apparatus according to claim 23, wherein said surface layer comprises insulating material applied over said electrodes.

25. Apparatus according to claim 23, wherein said electrodes are made of a thickness greater than [that] *the thickness* required for electrical functioning thereof.

26. Apparatus according to claim 1, wherein said channel side walls extend between top and bottom walls common to the array.

27. Apparatus according to claim 26, wherein said side walls are rigidly connected to said top and bottom walls to inhibit rotational movement of the side walls relative to the top and bottom walls.

28. Apparatus according to claim 26, wherein said electrically actuable means comprises piezo-electrical material extending substantially from the top to the bottom wall over said part of the said wall.

29. Apparatus according to claim 28, wherein said top and bottom walls are formed of electrically insulating material.

30. Apparatus according to claim 26, wherein each channel is formed with a communicating channel extension in either or both of the top and bottom walls.

31. Apparatus according to claim 30, wherein substantially all channel extensions are formed in the same one of the top and bottom walls.

32. Apparatus according to claim 30, wherein the channel extensions successive channels are formed alternately in the top and bottom walls.

33. Apparatus according to claim 1, wherein said nozzles communicate substantially directly with the respective channels.

34. Apparatus according to claim 1, wherein each channel contains [in a quiescent state] a volume [of liquid] V and wherein for each channel there are provided connecting means for connecting the channel with the respective nozzle, the internal [liquid] volume defined by each said connecting means being less than 0.1 V.

35. Apparatus according to claim 33, wherein said transversely displaceable side wall part extends from the location in each channel at which the channel communicates with the corresponding nozzle.

36. A high density multi-channel array, electrically pulsed droplet deposition apparatus for depositing droplets upon a surface moving relatively to the array, comprising a multiplicity of parallel droplet liquid channels arranged in pairs with the two channels of each pair being assigned respectively to a first and a second group of said channels, nozzles opening respectively into the channels, a longitudinal side wall provided for each pair of channels which is transversely in opposite senses and serves to divide the channels of the pair; electrically actuable means [adapted] *for,* in respective time alternating first and second operating modes, upon selection of any channel in respectively the first or second group of channels, [to effect] *effecting* transverse displacement [in the appropriate sense] of the side wall associated with the pair of channels including the selected channel, so as to cause a change of pressure in the selected channel to effect droplet ejection from the nozzle opening thereinto, *wherein the nozzles opening respectively into the two channels of each pair are mutually offset in the direction of relative movement of said surface by an amount commensurate with the time spacing between said first and second operating modes.*

37. Apparatus according to claim 36, wherein each channel of a channel pair is separated from the adjacent channel of the next succeeding pair by a fixed longitudinal wall.

38. Apparatus according to claim 36, wherein each channel of a channel pair is separated from the adjacent channel of the next pair by a displaceable longitudinal side wall, the electrically actuable means [being adapted], upon selection of a channel [to effect], *effecting* transverse displacement mutually toward one another of opposite side walls of the selected channel.

39. Apparatus according to claim 36, wherein each channel communicates with a respective channel extension projecting transversely from the channel and providing a volume not bounded by the corresponding side wall.

40. Apparatus according to claim 38, wherein each channel communicates with a respective channel extension with the channel extensions of the first and second groups of channels projecting in respective opposite directions.

41. Apparatus according to claim 40, wherein the channel extensions of each group of channels project through a common substrate and wherein portions of the substrate defined between adjacent channel extensions of each group are displaceable to effect pressure transfer between said adjacent channel extensions.

42. Apparatus according to claim 40, wherein the channel extensions associated with each group of channels extend within a common substrate and define cantilever substrate portions lying between adjacent channel extensions of the group.

43. Apparatus according to claim 42, wherein the two substrate portions bounding the channel extension of any channel are adapted to deflect under the action of a pressure change in said channel to compensate in the group neighbouring channels of said channel for pressure changes arising from compliant sidewall deformation.

44. Apparatus according to claim 39, wherein the volume of each channel extension is greater than the volume of the corresponding channel.

45. Apparatus according to claim 39, wherein each channel extension has a bounding surface which is generally coplanar with a longitudinal side wall surface of the corresponding channel.

46. A high density multi-channel array, electrically pulsed droplet deposition apparatus for depositing droplets upon a surface, comprising a multiplicity of parallel droplet liquid channels with successive channels being assigned alternately to a first and a second group of said channels, nozzles opening respectively into the channels, longitudinal side walls each serving to divide one channel from the next and each transversely displaceable in opposite senses; electrically actuable means [adapted] *for,* in respective time alternating first and second operating modes, upon selection of any channel in respectively the first or second group of channels, [to effect] *effecting* transversely displacement [in the appropriate senses] of both side walls associated with the selected channel, so as to cause a change of pressure in the selected channel to effect droplet ejection from the nozzle opening thereinto*, wherein successive channels are offset alternately in opposite senses along a direction normal both to the length of the channels and the direction in which the channels are spaced.*

47. Apparatus according to claim 46, wherein the nozzles communicating with the channels of the first group of channels are offset with respect to the nozzles communicating with the channels of the second group, by an amount commensurate with the time [spacing] *difference* between said first and second operating modes.

[48. Apparatus according to claim 46, wherein successive channels are offset alternately in opposite senses along a direction normal both to the length of the channels and the direction in which the channels are spaced.]

49. Apparatus according to claim [48] *46*, wherein the channels are formed in a body and the body portions bounded by any channel and neighbouring channels of the same group as said channel are adapted to deflect under the action of a pressure change in said channel to compensate in said neighbouring channels for pressure changes arising through compliant deformation of side walls.

50. A high density multi-channel array, electrically pulsed, droplet deposition apparatus, comprising a top wall, a bottom wall, side walls extending between and normal to said top and bottom walls to define therewith a multiplicity of parallel droplet liquid channels having respective longitudinal axes thereof disposed in a plane, respective nozzles opening into corresponding points of said channels for ejection of droplets of liquid from said channels and connection means for connecting said channels to a liquid source for affording replenishment of droplets ejected from said channels, wherein at least some of said side walls are formed substantially wholly from piezo-electric material and have respective wall parts adjacent said top and bottom walls with electrodes disposed on opposite surfaces of each of said wall parts extending parallel with said channels and normal to said plane to afford an electric field normal to said surfaces thereby to effect shear mode deflection of said wall parts in respective opposite senses transversely to [that channel] *said channels and* generally parallel to said plane, thereby to effect droplet ejection from [that channel] *at least one of said channels.*

51. Apparatus as claimed in claim 50, wherein substantially every side wall is transversely displaceable in respective opposite senses and said electrodes are adapted to be energized in a first mode of operation to effect transverse displacement mutually towards one another of opposite side walls of selected channels of a first series of channels to cause droplet ejection from said selected channels of said first series of channels while in a second mode of operation transverse displacement mutually towards one another is effected of opposite side walls of selected channels of a second series of channels, respective channels of which alternate with the channels of said first series, to cause droplet ejection from said selected channels of said second series.

52. Apparatus according to claim 51, wherein the nozzles of said first series of channels have their axes parallel and disposed in a first plane and the nozzles of said second series have their axes parallel and disposed in a second plane parallel with and spaced from said first plane by an amount to compensate for the time difference in droplet ejection from said first and second series of channels so that deposited droplets are disposed in predetermined manner.

53. A multi-channel array, electrically pulsed, droplet deposition apparatus comprising a multiplicity of parallel channels having longitudinal axes disposed in a plane and respective cross-sections extending normal to said plane and of rectangular form, respective nozzles connected with said channels for droplet ejection therefrom, and connection means for connecting said channels with a source of droplet deposition liquid, said channels being further characterised in that respective walls of piezo-electric material form sides of said channels extending normal to said plane of said channel axes and are poled in the direction parallel to said plane and electrodes are disposed on each of said walls of piezo-electric material to provide for an electric field therein normal to said direction of poling to cause deflection of said wall of piezo-electric material transversely to the axis of the channel of which [it] *said wall* forms a side to effect droplet ejection therefrom.

54. Apparatus as claimed in claim 53, characterised in that said channels are arranged in successive pairs and between the channels of each pair is a wall of piezo-electric material which is poled in the direction parallel to the plane of the channel axes and provides a common side wall of the corresponding pair of channels which extends normal to the plane of the axes of the channels and said electrodes are disposed in relation to each of said walls of piezo-electric material to effect transverse deflection of said wall into one of the channels of which the wall is part in a first mode of operation and transverse deflection of said wall in a second mode of operation into the other of the channels of which said wall forms part.

55. Apparatus as claimed in claim 53, characterized in that all side walls of said channels which extend normal to said plane at least partly comprise piezo-electric material extending throughout the wall length and poled in a direction parallel with said plane and transversely to said channel axes, said electrodes are disposed on each of said side walls to provide for an electric field therein normal to said direction of poling, and means for energizing said electrodes are provided which in a first mode of operation effect transverse deflection of opposite side walls of channels of a first series of channels with the deflected side walls of said channels of said series of channels moving mutually towards one another to cause droplet ejection from said channels of said first series of channels whose opposite side walls are deflected and in a second mode of operation transverse deflection is effected of opposite side walls of channels of a second series of channels respective channels of which alternate with the channels of said first series with the deflected side walls of said second series of channels moving mutually towards one another to cause droplet ejection from said channels of said second series whose side walls are deflected.

56. Apparatus as claimed in claim 55, characterised in that all of said side walls which extend normal to said plane comprise a central inactive wall part and outer wall parts of piezo-electric material respectively poled in directions parallel with said plane and transversely to said channel axes.

57. A multi-channel array, electrically pulsed, droplet deposition apparatus, comprising a multiplicity of parallel channels formed by parallel side walls and pairs of strips of piezo-electric material extending the length of said side walls, each pair of strips being sandwiched between successive of said side walls and spaced apart to form therewith a channel of rectangular cross-section, said multiplicity of channels so formed having their longitudinal axes disposed in a plane, respective nozzles communicating with said channels at corresponding ends thereof and respective connection means for connecting said channels to a source of droplet deposition liquid, each of said strips being poled in the same sense and in a direction parallel with said plane, there being provided electrodes at faces of said strips which are opposed to said side walls to provide in each of said strips an electric field in the poling direction thereof and electrode energising means which in a first mode of operation effect displacement of strips of some at least of said pairs of strips of a first series of channels to effect transverse movement in opposite directions of the side walls engaging the displaced strips and so cause droplet ejection from the channels of the side walls so moved, and, in a second mode of operation to effect displacement of the strips of some at least of said pairs of strips of a second series of channels of which the channels alternate with the channels of the first series to effect transverse movement in opposite directions of the side walls engaging the displaced strips and so cause droplet ejection from the channels of the side walls so moved, the electrode [energising] *energizing* means [being adapted in each of said modes of operation to effect] *for, in each of said modes of operation, effecting* displacement of each of the side walls of each channel from which a droplet is ejected by the same amount and in the same direction as the side walls forming with the side walls of each channel from which a droplet is ejected the channels next to and on opposite sides of said channel from which droplet ejection takes place.

[58. A multi-channel array, droplet deposition apparatus, comprising a multiplicity of parallel channels formed by bi-morph side walls and pairs of strips of inactive material each of which pairs is sandwiched between successive of said side walls to form therewith a channel of rectangular section, said multiplicity of channels so formed having their longitudinal axes disposed in a plane, and each of said bi-morph walls comprising at least one layer of piezo-electric material extending transversely to and poled in a direction parallel with said plane and provided with an electrode, respective nozzles communicating at corresponding locations with said channels and respective connection means for connecting said channels to a source of droplet deposition liquid, there being provided electrode energising means which in a first mode of operation effect transverse flexural displacement in respective opposite directions of some at least of opposite side walls of channels of a first series of channels to cause droplet ejection from the channels of the side walls so moved, and, in a second mode of operation effect transverse flexural displacement in respective opposite directions of some at least of opposite side walls of channels of a second series of channels of which the channels alternate with the channels of the first series to cause droplet ejection from the channels of the side walls so moved.]

59. A multi-channel array, electrically pulsed droplet deposition apparatus comprising a multiplicity of channels formed by parallel flexible side walls and spaced top and bottom planar walls with which said side walls engage at opposite ends thereof, said top and bottom walls being provided by respective layers of piezo-electric material poled in opposite senses normal thereto and formed by wall segments of rectangular cross-section of thicknesses in the direction between segments corresponding with the side wall thickness and channel width between successive of said side walls, said top and bottom walls being disposed with said segments thereof in line with opposite ends of said side walls and said channels, respective nozzles communicating with said channels at corresponding ends thereof and respective connection means for connecting said channels to a source of droplet deposition liquid, electrodes provided respectively between facing sides of said segments and electrode energising means which in a first mode of operation through shear mode deflection of segments of said top and bottom walls effects flexure in mutually opposite directions of opposed side walls of channels in a first series of channels to cause droplet ejection from the channels of the side walls so flexed, and, in a second mode of operation through shear mode deflection of segments of said top and bottom walls effects flexure in mutually opposite direction of opposed side walls of channels of a second series of channels of which the channels alternate with the channels of said first series to cause droplet ejection from the channels of the side walls so flexed.

60. A high density multi-channel array, electrically pulsed droplet deposition apparatus, comprising a multiplicity of parallel droplet liquid channels organized in groups and with corresponding channels of repeated sequences of said multiplicity of channels assigned respectively to said groups, nozzles opening respectively into said channels, longitudinal side walls each serving to divide one channel from the next and each transversely displaceable at least in one sense, electrically actuable means [adapted] *comprising piezoelectric material and electrode means for applying a field to the piezoelectric material, under the action of which field the piezoelectric material is deflected in sear mode for* in respective operating modes equal in number to the number of groups, upon selection of any channel in one of said groups [to effect], *effecting* transverse displacement in said at least one sense of one of the longitudinal walls of said selected channel so as to cause a change of pressure therein thereby to effect droplet ejection from the nozzle opening into said selected channel.

61. Apparatus as claimed in claim 60, wherein each longitudinal side wall is transversely displaceable in opposite senses and said electrically actuable means are adapted in said respective operating modes, upon selection of any channel in one of said groups to effect transverse displacement in appropriate senses of both the longitudinal side walls of said selected channel so as to cause a change of pressure in the selected channel to effect droplet ejection from the nozzle opening into said selected channel.

[62. Apparatus according to claim 36, wherein the nozzles opening into the channels of the first group of channels are offset in the direction of relative movement of said surface on which droplets are to be deposited, with respect to the nozzles opening into the channels of the second group of channels, by an amount commensurate with the time spacing between said first and second operating modes.]

*63. Apparatus according to claim 60, wherein the nozzles opening into the channels of the respective groups of channels are mutually offset in the direction of relative movement of said surface on which droplets are to be deposited, by an amount commensurate with the time spacing between said operating modes.*

*64. A high density multi-channel array, electrically pulsed droplet deposition apparatus, comprising a multiplicity of parallel droplet liquid channels organised in groups and with corresponding channels of repeated sequences of said multiplicity of channels assigned respectively to said groups, nozzles opening respectively into said channels, longitudinal side walls each serving to divide one channel from the next and each transversely displaceable at least in one sense, electrically actuable means for, in respective operating modes equal in number to the number of groups, upon selection of any channel in one of said groups effecting transverse displacement in said at least one sense of one of the longitudinal walls of said selected channel so as to cause a change of pressure therein thereby to effect droplet ejection from the nozzle opening into said selected channel, wherein each channel communicates with a respective channel extension projecting transversely from the channel and providing a volume not bounded by the corresponding side wall.*

*65. Apparatus as claimed in claim 64, wherein each longitudinal side wall is transversely displaceable in opposite senses and said electrically actuable means are adapted in said respective operating modes, upon selection of any channel in one of said groups to effect transverse displacement in appropriate senses of both the longitudinal side walls of said selected channel so as to cause a change of pressure in the selected channel to effect droplet ejection from the nozzle opening into said selected channel.*

*66. A high density multi-channel array, electrically pulsed droplet deposition apparatus, comprising a multiplicity of parallel droplet liquid channels organised in groups and with corresponding channels of repeated sequences of said multiplicity of channels assigned respectively to said groups, nozzles opening respectively into said channels, longitudinal side walls each serving to divide one channel from the next and each transversely displaceable at least in one sense, electrically actuable means for, in respective operating modes equal in number to the number of groups, upon selection of any channel in one of said groups, effecting transverse displacement in said at least one sense of one of the longitudinal walls of said selected channel so as to cause a change of pressure therein thereby to effect droplet ejection from the nozzle opening into said selected channel, wherein nozzles communicating with the channels of the respective groups of channels are mutually offset, by an amount commensurate with the time spacing between said operating modes.*

*67. Apparatus as claimed in claim 66, wherein each longitudinal side wall is transversely displaceable in opposite senses and said electrically actuable means are adapted in said respective operating modes, upon selection of any channel in one of said groups to effect transverse displacement in appropriate senses of both the longitudinal side walls of said selected channel so as to cause a change of pressure in the selected channel to effect droplet ejection from the nozzle opening into said selected channel.*

*68. A high density multi-channel array, electrically pulsed droplet deposition apparatus, comprising a multiplicity of parallel droplet liquid channels, mutually spaced in an array direction normal to the length of the channels, each of said channels extending in a lengthwise direction and being separated from a like channel by a side wall which is transversely displaceable in opposite senses and which extends in the lengthwise direction of the channels and in a direction which is both normal to said lengthwise direction and normal to the array direction, said side wall being formed at least in part of piezoelectric material, respective nozzles opening into said channels for ejection therefrom of droplets of liquid, connection means for connecting said channels to a source of droplet deposition liquid and an electrode in each channel establishing electrical contact with piezoelectric material in both side walls abutting said channel such that application of a voltage to the electrode of a selected channel affords an electric field in piezoelectric material in both said side walls abutting said channel to effect transverse displacement of both said side walls generally parallel to said array direction to cause change of pressure in said selected channel to effect droplet ejection from the nozzle opening thereinto.*

*69. Apparatus according to claim 68, wherein said channels are assigned alternately to a first and second group of said channels, said first and second groups of channels being enabled in respective time alternating first and second operating modes for the selection of channels therein for droplet ejection.*

*70. Apparatus according to claim 68, wherein said piezoelectric material is displaceable under the action of the applied field in shear mode.*

* * * * *

UNITED STATES PATENT AND TRADEMARK OFFICE

CERTIFICATE OF CORRECTION

PATENT NO. : Re. 36,667

DATED : April 25, 2000

INVENTOR(S) : Michaelis et al.

It is certified that error appears in the above-identified patent and that said Letters Patent is hereby corrected as shown below:

On the cover page under the heading "U.S. PATENT DOCUMENTS" please change "3,848,188" to --3,848,118--.

On page 1 of the cover page under the heading "U.S. PATENT DOCUMENTS" please change the classes and subclasses as follows:

For 3,747,120 Stemme change "346/75" to --347/70--

For 3,848,118 Rittberg change "239/101" to --347/68--

For 3,857,049 Zoltan change "310/8.1" to --310/328--

For 3,946,398 Kyser et al. change "346/1" to --347/70--

For 3,988,745 Sultan change "346/140R" to --347/68--

For 4,032,929 Fischbeck et al. change "346/140R" to --347/68--

For 4,104,646 Fischbeck change "346/140R" to --347/68--

For 4,158,847 Heinzl et al. change "346/140R" to --347/68--

For 4,189,734 Kyser et al. change "346/1.1" to --347/70--

For 4,216,483 Kyser et al. change "346/140R" to --347/70--

For 4,245,227 Krause change "346/75" to --347/75--

For 4,284,996 Greve change "346/140R" to --347/68--

For 4,353,078 Lee et al. change "346/140R" to --347/70--

For 4,367,478 Larsson change "346/140R" to --347/68--

For 4,368,476 Uehara et al. change "346/140R" to --347/68--

For 4,383,264 Lewis change "346/140R" to --347/68--

For 4,385,304 Sniderman change "346/140R" to --347/71--

For 4,409,602 Bolmgren et al. change "346/140R" to --347/68--

For 4,420,764 Okada et al. change "346/140R" to --347/68--

For 4,442,443 Martner change "346/140R" to --347/68--

UNITED STATES PATENT AND TRADEMARK OFFICE

CERTIFICATE OF CORRECTION

PATENT NO. : Re. 36,667

DATED : April 25, 2000

INVENTOR(S) : Michaelis et al.

It is certified that error appears in the above-identified patent and that said Letters Patent is hereby corrected as shown below:

On the cover page under the heading "FOREIGN PATENT DOCUMENTS" change "2 050 949" to --2 050 949 A--.

On page 2 of the cover page under the heading "U.S. PATENT DOCUMENTS" please change the classes and subclasses as follows:

For 4,453,169 Martner change "346/140 PD" to --347/68--

For 4,471,363 Hanaoka change "346/140R" to --347/68--

For 4,502,058 Koto change "346/140R" to --347/70--

For 4,520,374 Koto change "346/140R" to --347/70--

For 4,521,788 Kimura et al. change "346/140R" to --347/70--

For 4,525,728 Koto change "346/140R" to --347/70--

For 4,528,575 Matsuda et al. change "346/140R" to --347/71--

For 4,536,097 Nilsson change "400/126" to --347/68--

For 4,549,191 Fukuchi et al. change "346/140R" to --347/71--

For 4,550,325 Viola change "346/140R" to --347/68--

For 4,564,851 Nilsson et al. change "346/140R" to --347/68--

For 4,566,017 Nilsson change "346/140R" to --347/68--

For 4,566,018 Nilsson change "346/140R" to --347/68--

For 4,578,686 Vollert change "346/140R" to --347/72--

For 4,584,590 Fischbeck et al. change "346/140R" to --347/69--

For 4,599,628 Doring et al. change "346/140R" to --347/71--

For 4,635,079 Hubbard change "346/140R" to --347/68--

For 4,641,153 Cruz-Uribe change "346/140R" to --347/71--

For 4,641,155 Zoltan change "346/140R" to --347/68--

For 4,752,788 Yasuhara et al. change "346/140R" to --347/68--

UNITED STATES PATENT AND TRADEMARK OFFICE

CERTIFICATE OF CORRECTION

PATENT NO. : Re. 36,667

DATED : April 25, 2000

INVENTOR(S) : Michaelis et al.

It is certified that error appears in the above-identified patent and that said Letters Patent is hereby corrected as shown below:

Column 5, line 60 change "polling" to --poling--.

Column 9, line 54 change "pressure" to --pressures--.

Column 11, line 28 change "having" to --have--.

Column 15, line 59 change "extending in a lengthwise direction and" to --*extending in a lengthwise direction*"--.

Column 17, line 16 change "means" to --mean--.

Column 17, line 63 insert --of-- after "extensions".

Column 21, line 5 change "characterised" to --characterized--.

Column 21, line 26 change "energising" to --energizing--.

Column 22, line 44 change "*sear mode*" to --*shear mode*--.

Column 22, line 44 insert a comma after "for".

Signed and Sealed this

First Day of May, 2001

*Attest:*

Nicholas P. Godici

NICHOLAS P. GODICI

*Attesting Officer*

*Acting Director of the United States Patent and Trademark Office*